(12) United States Patent
Uchiyama et al.

(10) Patent No.: US 11,116,021 B2
(45) Date of Patent: Sep. 7, 2021

(54) COMMUNICATION APPARATUS AND TERMINAL APPARATUS

(71) Applicant: SONY CORPORATION, Tokyo (JP)

(72) Inventors: Hiromasa Uchiyama, Tokyo (JP); Naoki Kusashima, Kanagawa (JP); Kazuyuki Shimezawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 16/492,979

(22) PCT Filed: Feb. 6, 2018

(86) PCT No.: PCT/JP2018/004054
§ 371 (c)(1),
(2) Date: Sep. 11, 2019

(87) PCT Pub. No.: WO2018/173523
PCT Pub. Date: Sep. 27, 2018

(65) Prior Publication Data
US 2020/0084811 A1    Mar. 12, 2020

(30) Foreign Application Priority Data
Mar. 24, 2017   (JP) .............................. JP2017-058685

(51) Int. Cl.
*H04W 76/14* (2018.01)
*H04L 5/00* (2006.01)
(Continued)

(52) U.S. Cl.
CPC ........... *H04W 76/14* (2018.02); *H04L 5/0055* (2013.01); *H04W 72/042* (2013.01);
(Continued)

(58) Field of Classification Search
CPC ..... H04L 5/0044; H04L 5/0055; H04L 63/10; H04L 2012/5631; H04W 72/02;
(Continued)

(56) References Cited

U.S. PATENT DOCUMENTS

2007/0002743 A1*  1/2007  Fan ....................... H04W 28/20
                                                          370/235
2013/0208692 A1*  8/2013  Seo ....................... H04L 1/1829
                                                          370/329
(Continued)

FOREIGN PATENT DOCUMENTS

EP        3142459 A1    3/2017
JP      2016-511798 A   4/2016
(Continued)

OTHER PUBLICATIONS

Extended European Search Report of EP Application No. 18770368.1, dated Feb. 18, 2020, 08 pages.
(Continued)

*Primary Examiner* — Kan Yuen
(74) *Attorney, Agent, or Firm* — Chip Law Group

(57) ABSTRACT

There is provided a communication apparatus including a setting unit that sets a resource for device-to-device communication, in which the setting unit sets a resource pool including a plurality of sub resource pools as a resource for the device-to-device communication. One of the sub resource pools is an anchor sub resource pool that stores control information for monitoring by the device that performs the device-to-device communication.

15 Claims, 20 Drawing Sheets

(51) Int. Cl.
*H04W 72/04* (2009.01)
*H04W 88/04* (2009.01)
*H04W 92/18* (2009.01)

(52) U.S. Cl.
CPC ....... *H04W 72/0493* (2013.01); *H04W 88/04* (2013.01); *H04W 92/18* (2013.01)

(58) Field of Classification Search
CPC ............. H04W 72/042; H04W 72/044; H04W 72/048; H04W 72/0493; H04W 76/14; H04W 88/04; H04W 92/18; Y02D 30/70
See application file for complete search history.

(56) References Cited

U.S. PATENT DOCUMENTS

| | | | | |
|---|---|---|---|---|
| 2015/0334698 | A1* | 11/2015 | Park | H04L 5/0091 455/426.1 |
| 2016/0095024 | A1* | 3/2016 | Chae | H04L 5/0092 370/280 |
| 2016/0174279 | A1 | 6/2016 | Adachi et al. | |
| 2016/0295624 | A1* | 10/2016 | Novlan | H04W 72/04 |
| 2016/0338012 | A1* | 11/2016 | Liu | H04W 76/27 |
| 2017/0202043 | A1* | 7/2017 | Seo | H04W 76/14 |
| 2017/0245313 | A1* | 8/2017 | Kim | H04L 1/1854 |
| 2019/0364588 | A1* | 11/2019 | Lu | H04W 72/0466 |

FOREIGN PATENT DOCUMENTS

| | | | |
|---|---|---|---|
| WO | 2015/170727 | A1 | 11/2015 |
| WO | 2017/026542 | A1 | 2/2017 |

OTHER PUBLICATIONS

"Load Balancing via Dynamic Resource Sharing for Multiple Carriers and Pools", NEC, 3GPP TSG RAN WG1, 87th Meeting, R1-1611722, XP051189154, Reno, USA, Nov. 14-18, 2016, 04 pages.
"Resource Pool Design for Collision Detection and Handling", NEC, 3GPP TSG RAN WG1, 85th Meeting, R1-164476, XP051090280, Nanjing, China, May 23-27, 2016, 03 pages.
"Details of Resource Pool Design for Sidelink V2V Communication", Intel Corporation, 3GPP TSG RAN WG1, 86th Meeting, R1-166515, XP051125411, Gothenburg, Sweden, Aug. 22-26, 2016, 08 pages.
"D2D Communications", Interdigital, 3GPP TSG RAN WG1, 74th Meeting, Barcelona, Spain, Aug. 19-23, 2013, 07 pages.
"Details of resource pool design for sidelink V2V communication", Intel corporation, 3GPP TSG RAN WG1, 86th Meeting, Gothenburg, Sweden, Aug. 22-26, 2016, 08 pages.
"Resource pool for V2V", Lenovo, 3GPP TSG RAN WG1, 85th Meeting, Nanjing, China, May 23-27, 2016, 06 pages.
"Resource pool Design", Huawei, HiSilicon, 3GPP TSG RAN WG1, 84th Meeting, St. Julian's, Malta, Feb. 15-19, 2016, 05 pages.
"Details of resource pool design", Samsung, 3GPP TSG RAN WG1, 86th Meeting, Gothenburg, Sweden, Aug. 22-26, 2016, 04 pages.
"Resource pool allocation enhancement for V2V", ZTE, 3GPP TSG RAN WG1, 83rd Meeting, Anaheim, USA Nov. 15-22, 2015, 06 pages.
International Search Report and Written Opinion of PCT Application No. PCT/JP2018/004054, dated May 1, 2018, 10 pages of ISRWO.
"Details of resource pool design for sidelink V2V communication", Intel Corporation, 3GPP TSG RAN WG1, 86th Meeting, Gothenburg, Sweden, R1 -166515, XP051125411, Aug. 22-26, 2016, 08 pages.
Office Action for EP Patent Application No. 18770368.1, dated Apr. 15, 2021, 05 pages of Office Action.

* cited by examiner

COMMUNICATION APPARATUS AND TERMINAL APPARATUS

CROSS REFERENCE TO RELATED APPLICATIONS

This application is a U.S. National Phase of International Patent Application No. PCT/JP2018/004054 filed on Feb. 6, 2018, which claims priority benefit of Japanese Patent Application No. JP 2017-058685 filed in the Japan Patent Office on Mar. 24, 2017. Each of the above-referenced applications is hereby incorporated herein by reference in its entirety.

TECHNICAL FIELD

The present disclosure relates to a communication apparatus and a terminal apparatus.

BACKGROUND ART

There is an advancing technology related to device-to-device (D2D) communication using resources for cellular communication (refer to Patent Document 1, or the like). In particular, prevalence of a mechanism referred to as Internet of Things (IoT) used for connecting various objects to a network would increase the importance of device-to-device communications.

CITATION LIST

Patent Document

Patent Document 1: Japanese Patent Application National Publication (Laid-Open) No. 2016-511798

SUMMARY OF THE INVENTION

Problems to be Solved by the Invention

Together with an increase in the importance of device-to-device communication, there would be a need to consider ways to achieve low power consumption of the devices that perform the device-to-device communication in addition to enhancement of the communication quality of the device-to-device communication.

Accordingly, the present disclosure proposes a new and improved communication apparatus and terminal apparatus capable of achieving enhancement in communication quality of device-to-device communication while achieving low power consumption of a device that performs device-to-device communication.

Solutions to Problems

According to the present disclosure, there is provided a communication apparatus including a setting unit that sets a resource for device-to-device communication, in which the setting unit sets a resource pool including a plurality of sub resource pools as a resource for the device-to-device communication, and one of the sub resource pools is an anchor sub resource pool that stores control information for monitoring by the device that performs the device-to-device communication.

According to the present disclosure, there is provided a communication apparatus including a setting unit that sets a resource for device-to-device communication, in which the setting unit sets a plurality of sub resource pools in a resource pool assigned from a base station for device-to-device communication, and one of the sub resource pools is an anchor sub resource pool that stores control information for monitoring by the device that performs the device-to-device communication.

According to the present disclosure, there is provided a terminal apparatus including a control unit that performs control for device-to-device communication, in which the control unit performs control to perform the device-to-device communication in the resource pool including a plurality of sub resource pools including an anchor sub resource pool that stores control information for the device-to-device communication, assigned for the purpose of the device-to-device communication.

Effects of the Invention

As described above, according to the present disclosure, it is possible to provide a new and improved communication apparatus and terminal apparatus capable of achieving enhancement in communication quality of device-to-device communication while achieving low power consumption of the device that performs device-to-device communication.

Note that the above-described effect is not necessarily limited, and it is also possible to use any one of the effects illustrated in this specification together with the above-described effect or in place of the above-described effect, or other effects that can be assumed from this specification.

MODE FOR CARRYING OUT THE INVENTION

Figure 1:
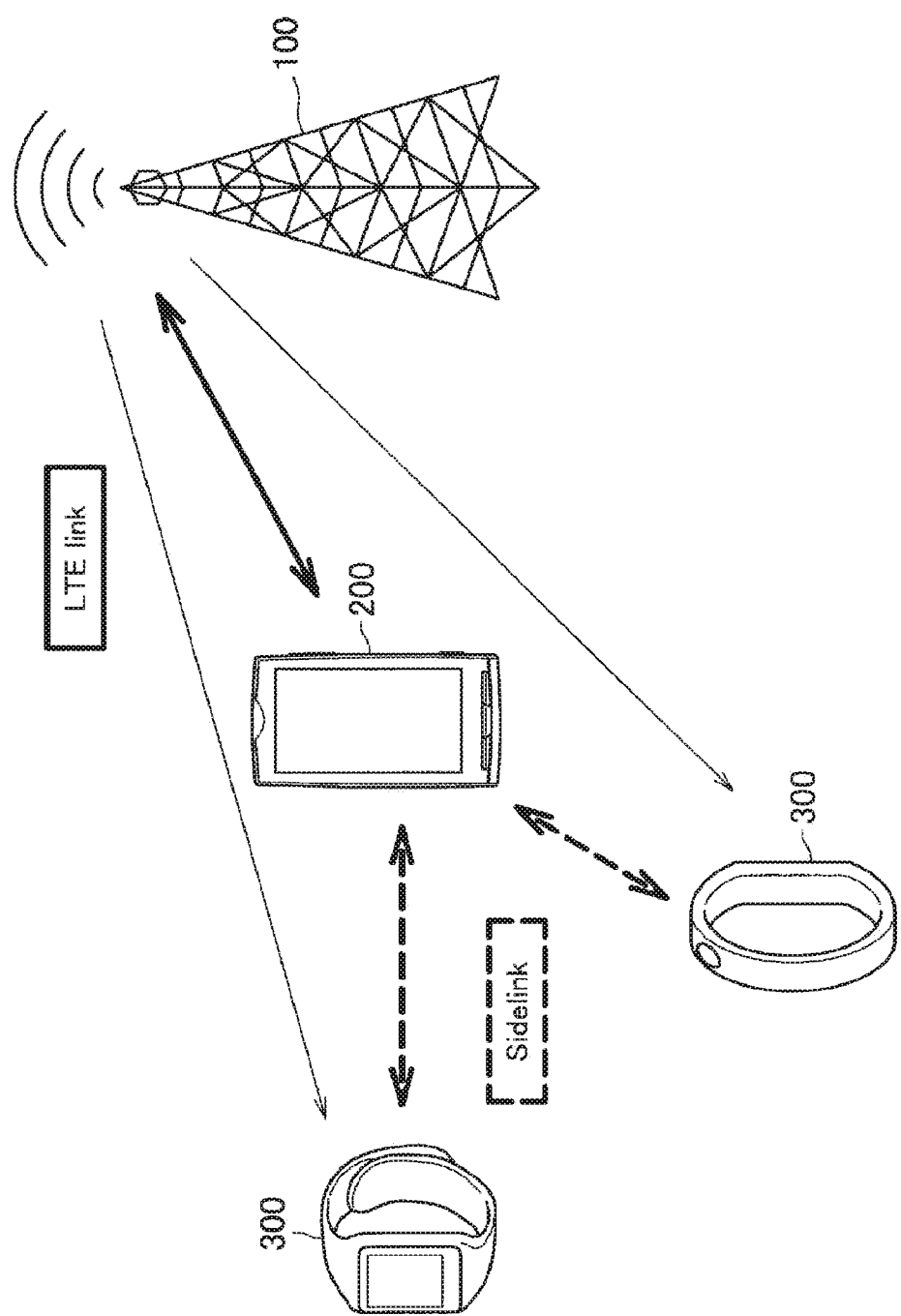
FIG. 1 is a diagram illustrating an example of relay communication using a relay terminal for a wearable terminal.

Hereinafter, preferred embodiments of the present disclosure will be described in detail with reference to the accompanying drawings. Note that same reference numerals are given to components having substantially a same functional configuration, and redundant description is omitted in the present specification and the drawings.

Note that the description will be given in the following order.

1. Embodiments of present disclosure
1.1. Overview
1.2. Configuration example
1.3. Operation example
2. Application example
3. Summary

1. Embodiments of Present Disclosure

1.1. Overview

First, before describing the embodiment of the present disclosure in detail, an outline will be described to illustrate a background of the embodiment of the present disclosure.

IoT related research and development is actively conducted and is attracting attention. In IoT, wireless communication is becoming a more important technological theme because things need to be connected to a network. In Third Generation Partnership Project (3GPP), standardization of communication schemes specialized for IoT terminals such as Machine Type Communication (MTC) and Narrow Band IoT (NB-IoT) has been performed. The features of these communication schemes include low power consumption, low cost, and large coverage. Especially since low power consumption communication becomes very important for low cost terminals such as IoT terminals, further future enhancement is desired.

A typical example of a low cost terminal is a wearable terminal. Wearable terminals need to achieve low power consumption, highly reliable communication, and in some cases, large capacity communication. In order to cover such use cases, standardization of Further enhancement D2D (FeD2D) has started in 2016 in 3GPP. Since a wearable terminal exists around a user, it is possible to reduce the communication distance and achieve low power consumption and high reliability communication by using relay communication using a user terminal such as a smartphone. Note that in the following description, wearable terminals, IoT terminals, and the like that communicate with relay terminals will also be referred to as "remote terminals".

FIG. 1 is a diagram illustrating an example of relay communication using a relay terminal for a wearable terminal. FIG. 1 illustrates a base station 100, a relay terminal 200, and a remote terminal 300. An assumable example of the relay terminal 200 is a smartphone of the user or the like, and an assumable example of the remote terminal 300 is a wearable terminal. The relay terminal 200 communicates with the base station 100 on the basis of communication standards such as Long Term Evolution (LTE) and standard subsequent to the LTE, while communicating with the remote terminal 300 using a sidelink. The remote terminal 300 communicates with the base station 100 via the relay terminal 200. Furthermore, the remote terminal 300 can also directly communicate with the base station 100.

In relay communication for such wearable terminals, it would be important to ensure end-to-end communication quality (Quality of Service (QoS)) between the base station and the remote terminal, leading to necessity to establish a highly reliable communication path. Furthermore, since a wearable terminal is assumed to be used as the remote terminal, simple, low cost, and low power consumption communication would be needed. In order to meet these requirements, the implementation of the following items would be preferable.

Improvement of Sidelink Communication

In the sidelink, closed loop feedback communication such as retransmission has not been performed. Therefore, functions such as link adaptation and Hybrid Automatic repeat-request (HARQ) are preferably to be supported to achieve QoS and high-reliability communication.

Achieving Low Power Consumption

In relay communication for wearable terminals, it is necessary to achieve low power consumption in power control and Discontinuous Reception (DRX), or the like.

Service Continuity

Since link quality changes dynamically in relay communication for wearable terminals, it is necessary to achieve optimization of handover and path switching in order to ensure service continuity.

Figure 2:
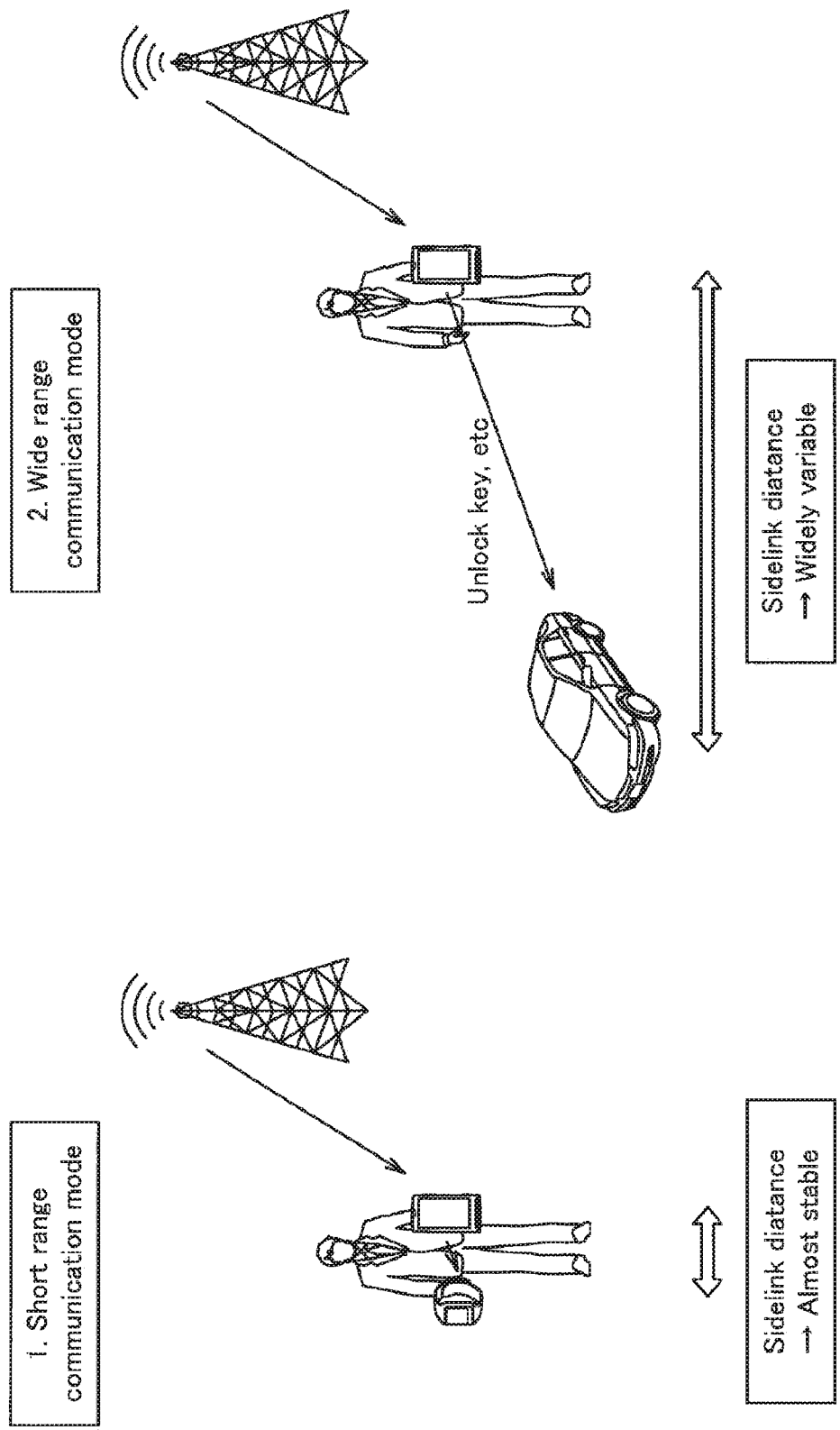
FIG. 2 is a diagram illustrating an example of a communication environment assumed in relay communication for a wearable terminal.

In such relay communication for wearable terminals, there is a need to cover various operation environments. FIG. 2 is a diagram illustrating an example of a communication environment assumed in relay communication for a wearable terminal. Here, two environments, a short range communication environment and a wide range communication environment, are assumed. Although the term "wearable terminal" is likely to lead to an assumption that the user is holding the terminal (in short range communication), there is no need to technically limit to a situation where the user wears a wearable terminal. That is, such relay communication can be implemented even in an environment where the terminal is not worn by the user. Therefore, it is desirable that not only short range communication but also wide range communication be supported using a relay in a similar manner.

Another characteristic point in operation environments is traffic. Terminals assumed to be used as remote terminals range from terminals needing high data rates to terminals using communication of very small amount of data packets, such as car key unlocking, for example, leading to a need to support a wide range of traffic volume variations.

Due to the above, FeD2D needs to allow efficient communication of a wide range of traffic volume variations for various deployment scenarios. That is, it is desirable that appropriate communication be provided in accordance with an operation status of relay communication.

For example, the sidelink in relay communication needs link adaptation and retransmission control using feedback in order to ensure QoS and reliability. However, for example, performing communication of a very small amount of packets in a stable status with a short communication distance might not necessary need such link adaptation or retransmission control.

Relay communication using a relay base station has so far been standardized by 3GPP. However, standardized relay communication is different from assumable cases of the present embodiment. Main differences will be described below.

First, while the relay base station is fixed, the relay terminal has a mobility function. Furthermore, while the relay base station is owned by an operator and operates with an authority equivalent to the base station, the relay terminal is owned by a user, and the authority as infrastructure is restricted by the relay base station. Furthermore, normally, the relay terminal is supposed to operate under the control of the base station.

Furthermore, although communication at the relay base station assumes use of a mobile terminal owned by a user such as a smartphone, communication at the relay terminal need to support various communication traffic types such as an MTC terminal, an NB-IoT terminal, or a smartphone terminal.

Furthermore, the terminal deployment in the relay base station has a uniform distribution within the coverage. In contrast, in a use case of the wearable relay terminal, deployment is classified into a case of near field communication in which a wearable device is worn, and the other cases. Remote terminal deployment is characteristic, significantly different from deployment of a relay base station.

In view of the above-described points, in FeD2D communication for wearable terminals and IoT terminals, there is a demand for improved sidelink based on 3GPP Rel-12 D2D to satisfy the following requirements.

Supporting Status Having Different Bandwidth for Relay and Remote

For example, there is a need to support a case where MTC terminal needs six resource blocks while NB-IoT needs only one resource block.

Supporting QoS

The existing D2D communication has been a communication without QoS support using broadcast communication because 3GPP Rel-12 D2D have been provided for public safety. FeD2D communication needs to be highly reliable and low delay communication.

Achieving Low Power Consumption

In FeD2D communication, it is desired to achieve low power consumption for both remote terminals and relay terminals.

Maintaining Single Carrier Property

Since Single Carrier-Frequency Division Multiple Access (SC-FDMA) communication is performed on the sidelink, multi-cluster communication is preferably to be avoided in FeD2D communication.

Reducing Influence of IBE

Compared with normal cellular communication between a base station and a terminal, the D2D communication has different topologies for transmission and reception. Since transmission and reception terminals are mixed in the network, it is necessary to reduce a problem of In-Band Emission (IBE).

Supporting Various Types of Traffic

FeD2D communication is the communication for commercial wearable terminals and thus needs to support various types of traffic. For example, FeD2D communication needs to support VoIP, video streaming, MTC traffic, and the like.

Therefore, in view of the above-described point, the present disclosing persons have intensively examined a technology for achieving enhancement of the communication quality of FeD2D communication, while achieving low power consumption of the relay terminal and the remote terminal, in FeD2D communication for remote terminals. As a result, the present disclosing persons have devised, in the FeD2D communication for remote terminals, a technology that has achieved enhancement in communication quality of FeD2D communication while achieving low power consumption of relay terminals and remote terminals, as described below.

The process of conceiving the embodiment of the present disclosure has been described above. Subsequently, a functional configuration example of individual devices constituting a communication system according to an embodiment of the present disclosure will be described.

1.2. Configuration Example

Figure 3:
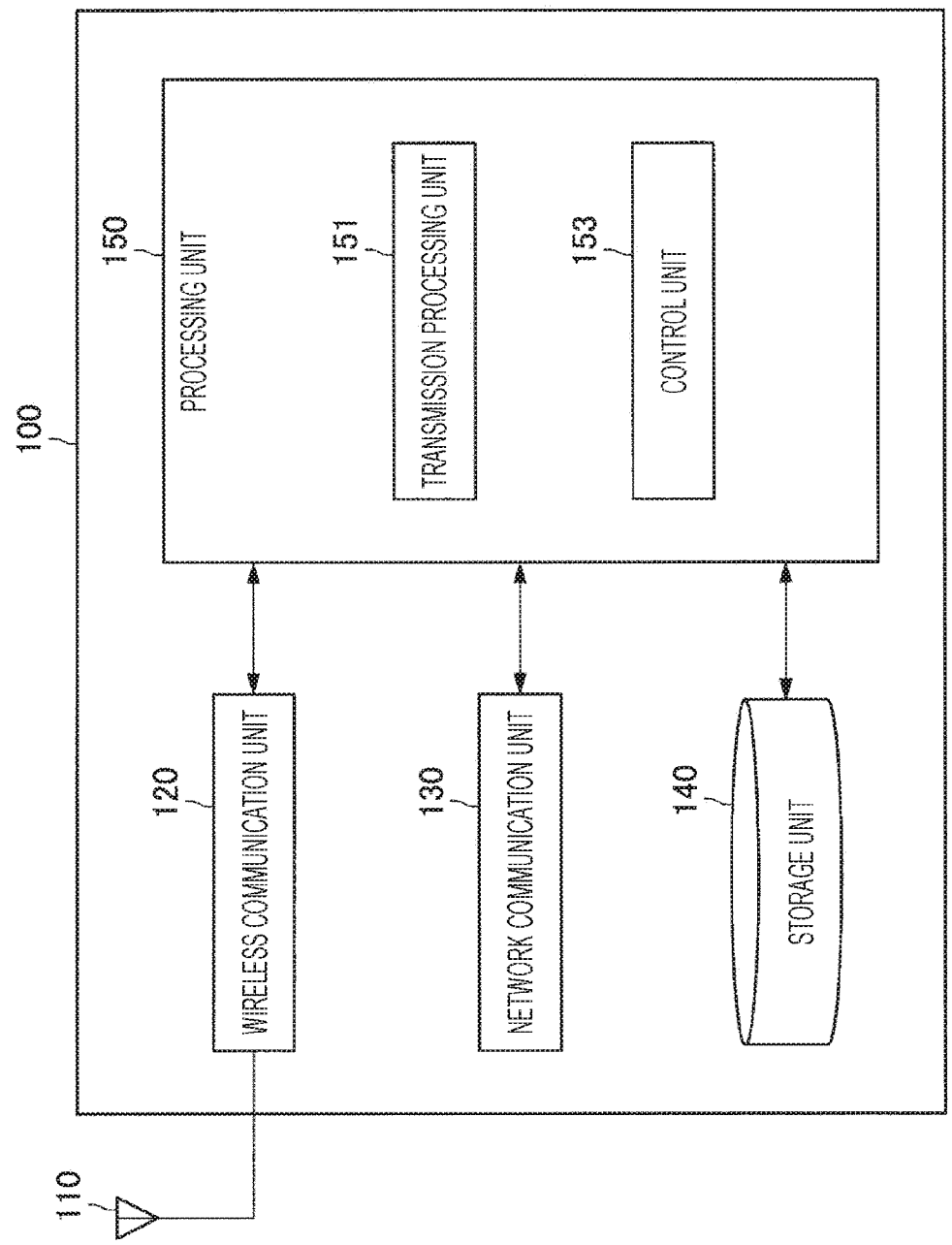
FIG. 3 is a diagram illustrating a configuration example of a base station according to the embodiment of the present disclosure.

FIG. 3 is a diagram illustrating a configuration example of a base station according to an embodiment of the present disclosure. As illustrated in FIG. 3, the base station 100 according to an embodiment of the present disclosure includes an antenna unit 110, a wireless communication unit 120, a network communication unit 130, a storage unit 140, and a processing unit 150.

Antenna Unit 110

The antenna unit 110 radiates a signal output from the wireless communication unit 120 into space as a radio wave.

Furthermore, the antenna unit 110 converts a radio wave in space into a signal, and outputs the signal to the wireless communication unit 220.

Wireless Communication Unit 120

The wireless communication unit 120 transmits and receives signals. For example, the wireless communication unit 120 transmits a downlink signal to the relay terminal 200 or the remote terminal 300, and receives an uplink signal from the relay terminal 200 or the remote terminal 300.

Network Communication Unit 130

The network communication unit 130 transmits and receives information. For example, the network communication unit 130 transmits information to other nodes and receives information from other nodes. For example, the other nodes include a core network and other base stations.

Storage Unit 140

The storage unit 140 temporarily or permanently stores programs and data for the operation of base station 100.

Processing Unit 150

The processing unit 150 provides various functions of the base station 100. The processing unit 150 includes a transmission processing unit 151 and a control unit 153. Note that the processing unit 150 can further include other components in addition to these components. That is, the processing unit 150 can also perform operation other than the operation of these components.

Transmission Processing Unit 151

The transmission processing unit 151 executes processing related to transmission of data from the base station 100. Specifically, the transmission processing unit 151 generates data to be transmitted in downlink communication to the relay terminal 200 and the remote terminal 300.

Control Unit 153

The control unit 153 executes various types of processing of the base station 100. For example, the control unit 153 executes various types of processing related to setting of resources, which will be described later. Accordingly, the control unit 153 can operate as an example of the setting unit of the present disclosure.

Figure 4:
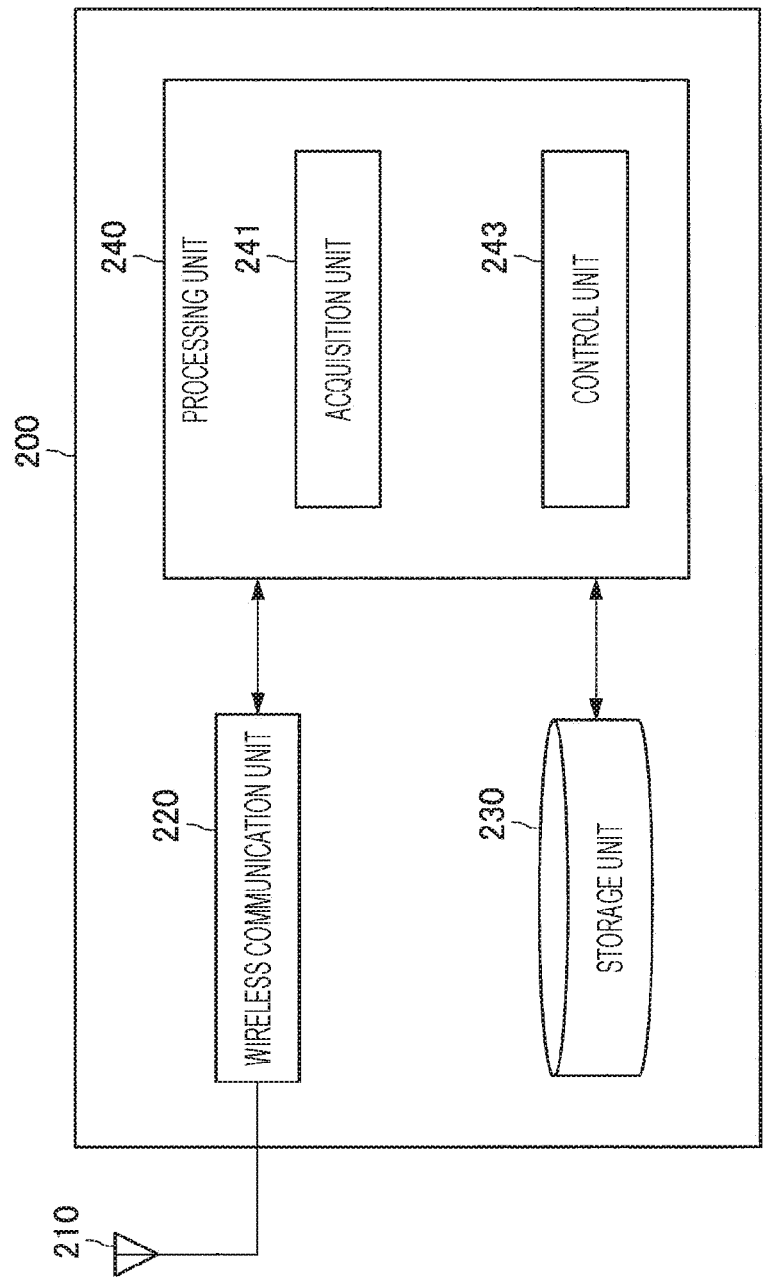
FIG. 4 is a diagram illustrating a configuration example of a relay terminal according to the same embodiment.

FIG. 4 is a diagram illustrating a configuration example of a relay terminal according to the embodiment of the present disclosure. As illustrated in FIG. 4, the relay terminal 200 according to the embodiment of the present disclosure includes an antenna unit 210, a wireless communication unit 220, a storage unit 230, and a processing unit 240.

(1) Antenna Unit 210

The antenna unit 210 radiates a signal output from the wireless communication unit 220 into space as a radio wave. Furthermore, the antenna unit 210 converts a radio wave in space into a signal, and outputs the signal to the wireless communication unit 220.

(2) Wireless Communication Unit 220

The wireless communication unit 220 transmits and receives signals. For example, the wireless communication unit 220 receives a downlink signal from the base station 100 and transmits an uplink signal to the base station 100. Furthermore, the wireless communication unit 220 transmits a sidelink signal to the remote terminal 300 and receives a sidelink signal from the remote terminal 300.

(3) Storage Unit 230

The storage unit 230 temporarily or permanently stores programs and various data for the operation of the relay terminal 200.

(4) Processing Unit 240

The processing unit 240 provides various functions of the relay terminal 200. The processing unit 240 includes an acquisition unit 241 and a control unit 243. Note that the processing unit 240 can further include other components in addition to these components. That is, the processing unit 240 can also perform operation other than the operation of these components.

The acquisition unit 241 executes processing related to acquisition of data transmitted from the base station 100 or the remote terminal 300. The control unit 243 executes processing related to the operation of the relay terminal 200, and executes, for example, processing related to reception of data obtained by the acquisition unit 241. The control unit 243 executes processing related to a resource for device-to-device communication, which will be described below. The control unit 243 also executes processing related to transmission and reception of information regarding device-to-device communication, which will be described below.

Figure 5:
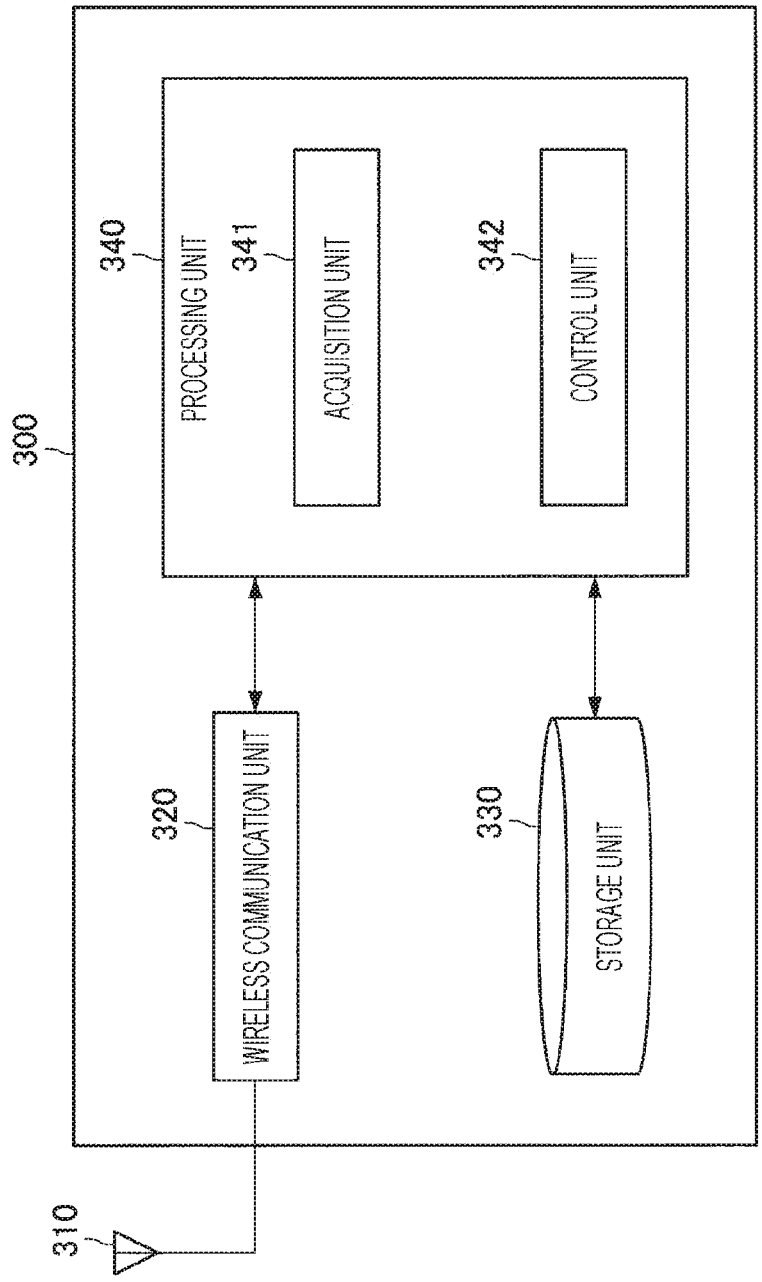
FIG. 5 is a diagram illustrating a configuration example of a remote terminal according to the same embodiment.

FIG. 5 is a diagram illustrating a configuration example of the remote terminal according to an embodiment of the present disclosure. As illustrated in FIG. 5, the remote terminal 300 according to the embodiment of the present disclosure includes an antenna unit 310, a wireless communication unit 320, a storage unit 330, and a processing unit 340.

(1) Antenna Unit 310

The antenna unit 310 radiates the signal output from the wireless communication unit 320 into space as a radio wave. Furthermore, the antenna unit 310 converts a radio wave in space into a signal, and outputs the signal to the wireless communication unit 320.

(2) Wireless Communication Unit 320

The wireless communication unit 320 transmits and receives signals. For example, the wireless communication unit 320 receives a downlink signal from the base station 100 and transmits an uplink signal to the base station 100. Furthermore, the wireless communication unit 320 transmits a sidelink signal to the relay terminal 200 and receives a sidelink signal from the relay terminal 200.

(3) Storage Unit 330

The storage unit 330 temporarily or permanently stores programs and various data for the operation of the remote terminal 300.

(4) Processing Unit 340

The processing unit 340 provides various functions of the remote terminal 300. The processing unit 340 includes an acquisition unit 341 and a control unit 343. Note that the processing unit 340 can further include other components other than these components. That is, the processing unit 340 can also perform operation other than the operation of these components.

The acquisition unit 341 executes processing related to acquisition of data transmitted from the base station 100 or the relay terminal 200. The control unit 343 executes processing related to the operation of the relay terminal 200, and executes, for example, processing related to reception of data obtained by the acquisition unit 341. The control unit 343 executes processing related to a resource for device-to-device communication described below. Furthermore, the control unit 343 executes processing related to transmission and reception of information regarding device-to-device communication, which will be described below.

Hereinabove, the functional configuration example of individual devices according to the embodiment of the present disclosure has been described. Subsequently, an operation example of the communication system according to the embodiment of the present disclosure will be described.

1.3. Operation Example

First, resources used in FeD2D communication in the present embodiment will be described. The FeD2D communication in the present embodiment uses a plurality of sub resource pools configured in a resource pool. That is, a set of sub resource pools makes a resource pool. The sub resource pool may be set as a minimum supportable bandwidth in a specific terminal category. For example, in the FeD2D system, at least 6 RBs (Physical Resource Block: 1 RB=180 khz) for MTC terminals and 1 RB for NB-IoT terminals are to be supported. Of course, sub resource pools other than the above may be set. For example, in a V2X (inter-vehicle and road-to-vehicle communication) system, for example, a value of a minimum possible support bandwidth (for example, 50 RBs or the like) for a V2X terminal may be set. Although FeD2D communication is described in the present embodiment, it is allowable to perform application to systems other than FeD2D communication, such as V2X.

The resource pool and the sub resource pool are configured using a portion of a licensed band. The resource pool and the sub resource pool are generally assigned uplink bands. Furthermore, the resource pool and the sub resource pool may be configured using an unlicensed band.

The sub resource pool may have a hierarchical configuration. For example, a sub resource pool B may be a subset of a sub resource pool A, and the sub resource pool A may be a subset of a resource pool. In the example of MTC terminal and NB-IoT terminal, 1 RB sub resource pool B for NB-IoT terminal is a subset of 6 RB sub resource pool A for MTC terminals, and the sub resource pool A is a subset of the resource pool.

The resource allocation assignment policy may be changed for each of a resource pool, a group of sub resource pools, and a sub resource pool. For example, Mode 1 communication may be set in a sub resource pool group 1, and Mode 2 communication may be set in a sub resource pool group 2.

Figure 6:
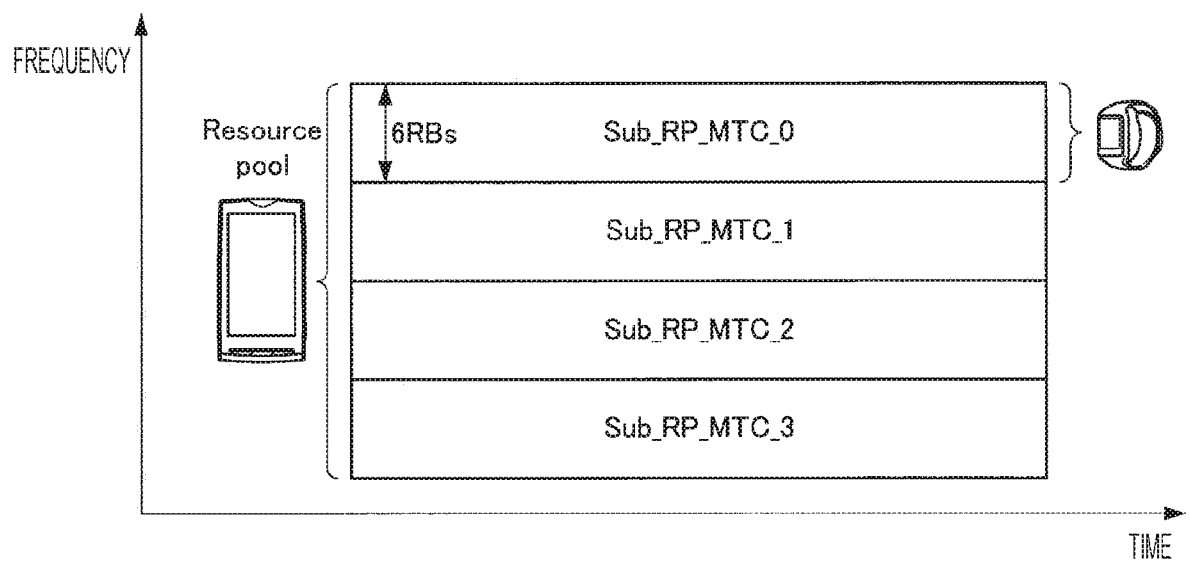
FIG. 6 is a diagram illustrating a configuration example of a sub resource pool.
Figure 7:
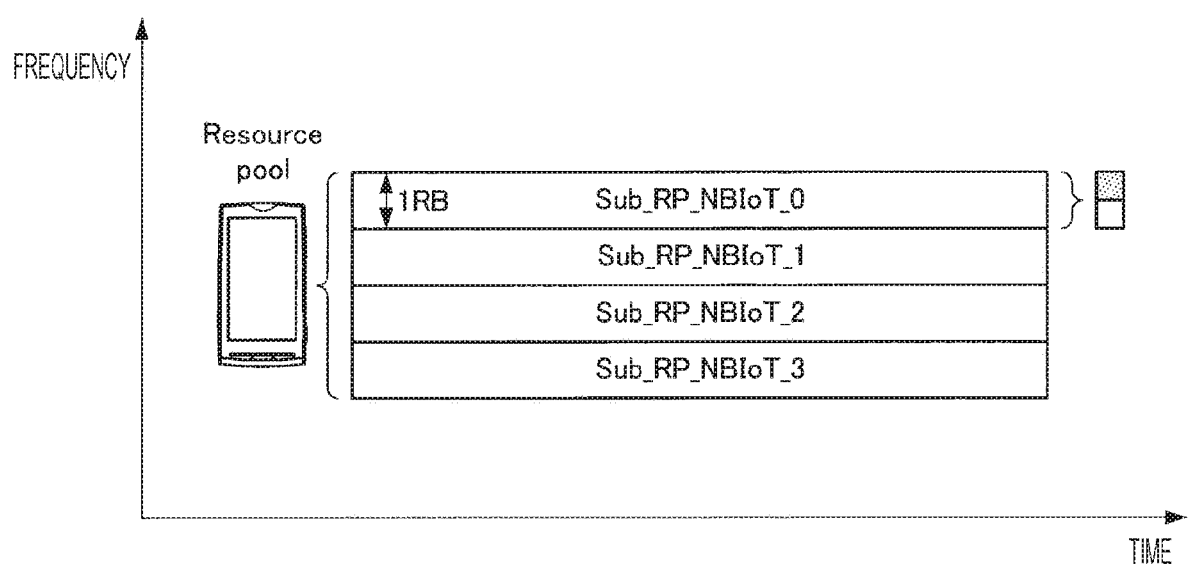
FIG. 7 is a diagram illustrating a configuration example of a sub resource pool.

FIGS. 6 to 9 are diagrams illustrating a configuration example of the sub resource pools. FIG. 6 illustrates an example of a resource pool including 6 RB sub resource pools (Sub_RP_MTC_0 to 4) for 4 MTC terminals. FIG. 7 illustrates an example of a resource pool including 1 RB sub resource pools (Sub_RP_NBIoT_0 to 3) for 4 NB-IoT terminals.

Figure 8:
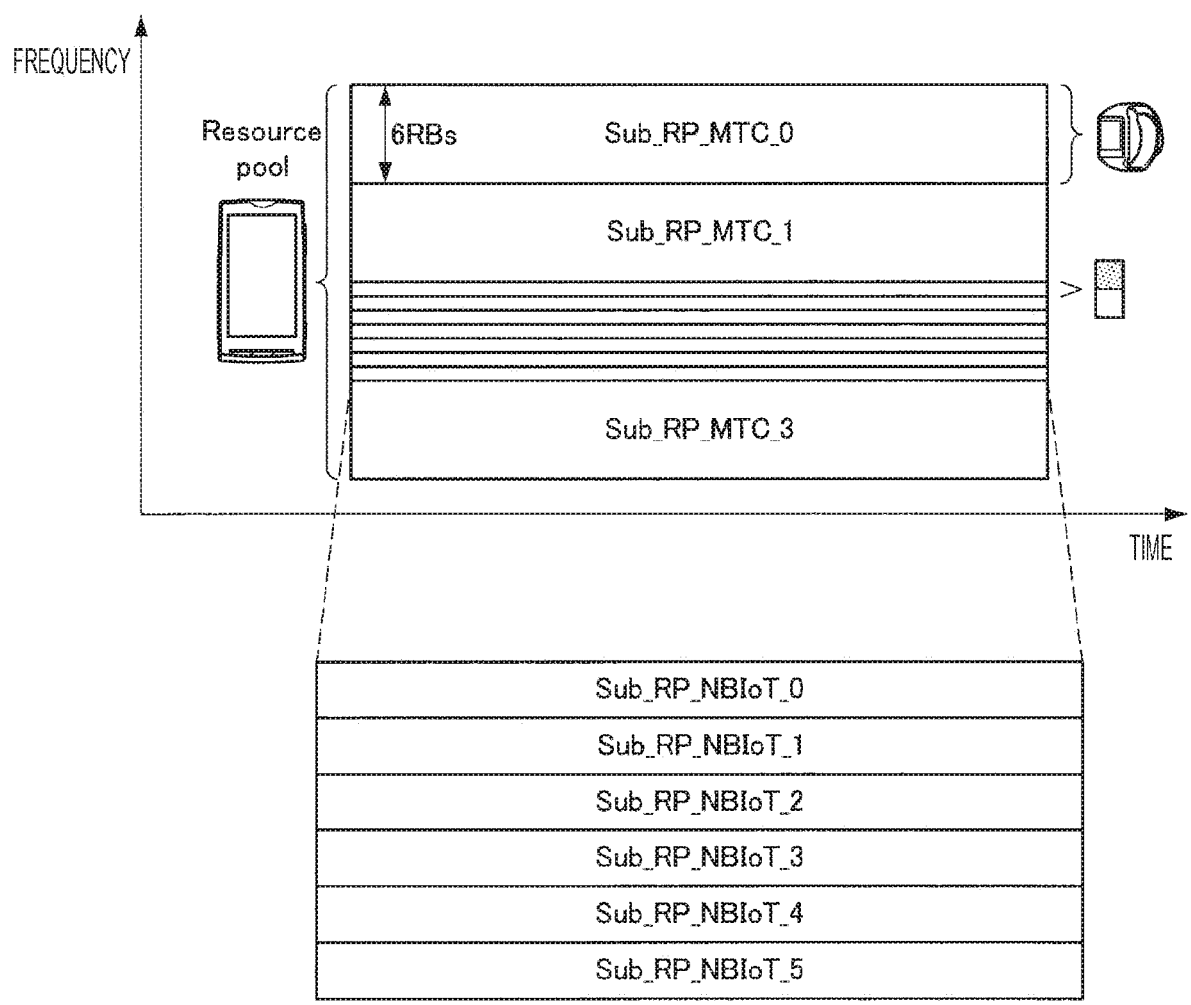
FIG. 8 is a diagram illustrating a configuration example of a sub resource pool.

FIG. 8 illustrates an example of a resource pool including 6 RB sub resource pools (Sub_RP_MTC_0, 1, and 3) for 3 MTC terminals and including 1 RB sub resource pool (Sub_RP_NBIoT_0 to 5) for 6 NB-IoT terminals. The sub resource pool for NB-IoT terminals is set to one of the sub resource pools for MTC terminals. That is, illustrated is an example in which sub resource pools for NB-IoT terminals are set hierarchically to sub resource pools for MTC terminals.

Figure 9:
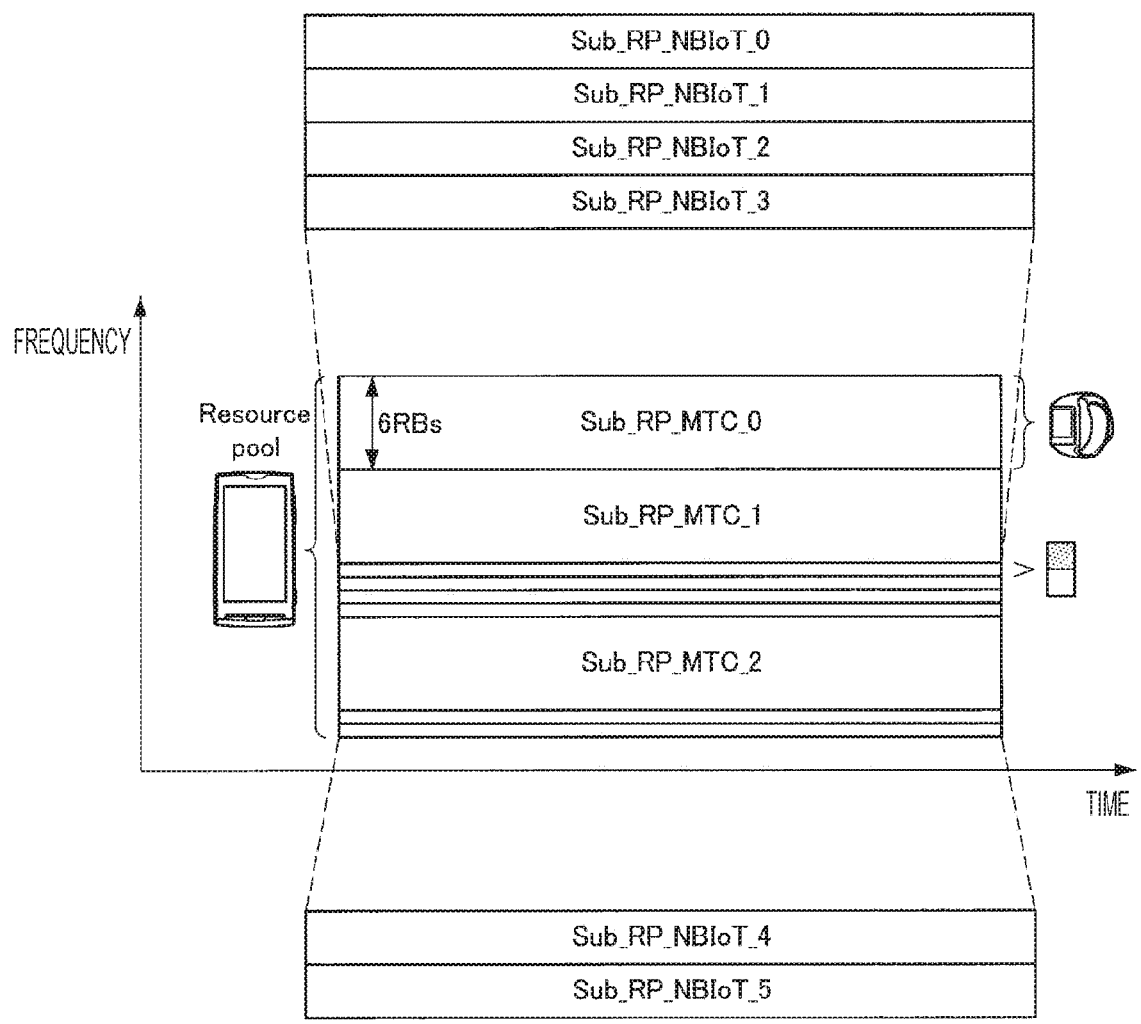
FIG. 9 is a diagram illustrating a configuration example of a sub resource pool.

FIG. 9 illustrates an example of a resource pool including 6 RB sub resource pools (Sub_RP_MTC_0 to 2) for 3 MTC terminals and 1 RB sub resource pool (Sub_RP_NBIoT_0 to 5) for 6 NB-IoT terminals. That is, illustrated is an example in which the sub resource pool for MTC terminals and the sub resource pool for NB-IoT terminals are set independently.

In the present embodiment, sidelink communication from the relay terminal 200 to the remote terminal 300 will be referred to as sidelink-downlink (SL-DL) communication, while sidelink communication from the remote terminal 300 to the relay terminal 200 will be referred to as sidelink-uplink (SL-UL) communication. In the resource pool and the sub resource pool, the sub resource pool for SL-DL and the sub resource pool for SL-UL may be set independently from the viewpoint of the remote terminal. At independent settings, it is allowable to set by FDD or TDD. The anchor sub resource pool described later is at least a sub resource pool for SL-DL.

The sidelink-downlink and sidelink-uplink are determined by the base station 100 or the relay terminal 200, and are set in the remote terminal 300 by SL-RRC signaling or Master Information Block-Sidelink (MIB-SL).

The sidelink-downlink and sidelink-uplink may be set per resource pool or per sub resource pool group. Furthermore, the sidelink-downlink and the sidelink-uplink may be set per sub resource pool.

The resource allocation policy may be changed for each of sidelink-downlink or sidelink-uplink. For example, Mode 1 communication may be used for sidelink-downlink and Mode 2 communication may be used for sidelink-uplink.

In a case where a plurality of sub resource pools is assigned in the resource pool, the remote terminal 300 needs to monitor the plurality of sub resource pools, which is not efficient. However, with a method of rastering each of sub resource pools and finding a resource assigned to the own sub resource pool, the remote terminal 300 might miss the reception opportunity, leading to an increase in the power consumption of the remote terminal 300.

To cope with this, in the present embodiment, one sub resource pool in a plurality of sub resource pools within a resource pool is defined as an anchor sub resource pool.

One anchor sub resource pool may be set for each of sizes in frequency directions of the sub resource pool. For example, in a case where an A group including 6 RB sub resource pools and a B group including 1 RB sub resource pools coexist in a resource pool, one anchor sub resource pool may be set for each of the groups.

In a case where the anchor sub resource pool is set for the remote terminal 300, the remote terminal 300 monitors all or any one or more of synchronization signals, system information, and control information (control channel) within the anchor sub resource pool. That is, the remote terminal 300 would not have to monitor information monitored in the anchor sub resource pool in sub resource pools other than the anchor sub resource pool. Here, the synchronization signal is a sidelink synchronization signal (SLSS), and the system information can include a physical sidelink broadcast channel (PSBCH) or a sidelink control information (SCI).

It is allowable to set resource pools for the Control region (Control) and Data region (Data) in the anchor sub resource pool, and allowable to set simply the resource pool for the Data region in the sub resource pools other than the anchor sub resource pool.

Control information in an anchor sub resource pool can include assignment information of one of data in the anchor sub resource pool or data in other sub resource pools. In that case, the assignment information can include information indicating a sub resource pool to which data is to be assigned.

Furthermore, the sub resource pool to which data is to be assigned may be implicitly determined by linking to the resource in which the control information has been detected. In this case, it is not necessary to explicitly provide notification of the information indicating the sub resource pool to which data is to be assigned.

The setting position of the anchor sub resource pool may be preliminarily fixed, and may be provided in notification from the base station 100 together with resource pool or sub resource pool configuration information using RRC signaling or the like. Notification of the setting position of the anchor sub resource pool may be performed, for example, under the control of the control unit 153 by the transmission processing unit 151. For example, the sub resource pool located at the highest frequency position in each of sub resource pool groups may be set as an anchor sub resource pool in each of the sub resource pool groups. The position information of the sub resource pool may be provided in notification from the base station 100 as the number of the sub resource pool, or may be provided in notification as direction information in the frequency direction, such as the top, bottom, and center.

Note that, in the sidelink communication using the unlicensed band, the anchor sub resource pool alone may be provided from the base station 100 using the licensed band.

Figure 10:
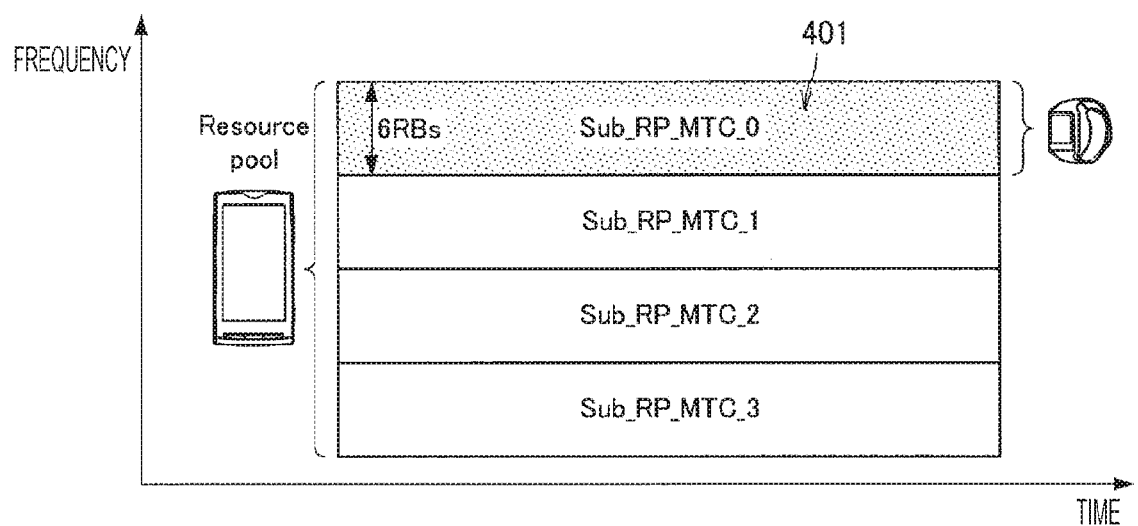
FIG. 10 is a diagram illustrating a setting example of an anchor sub resource pool.
Figure 11:
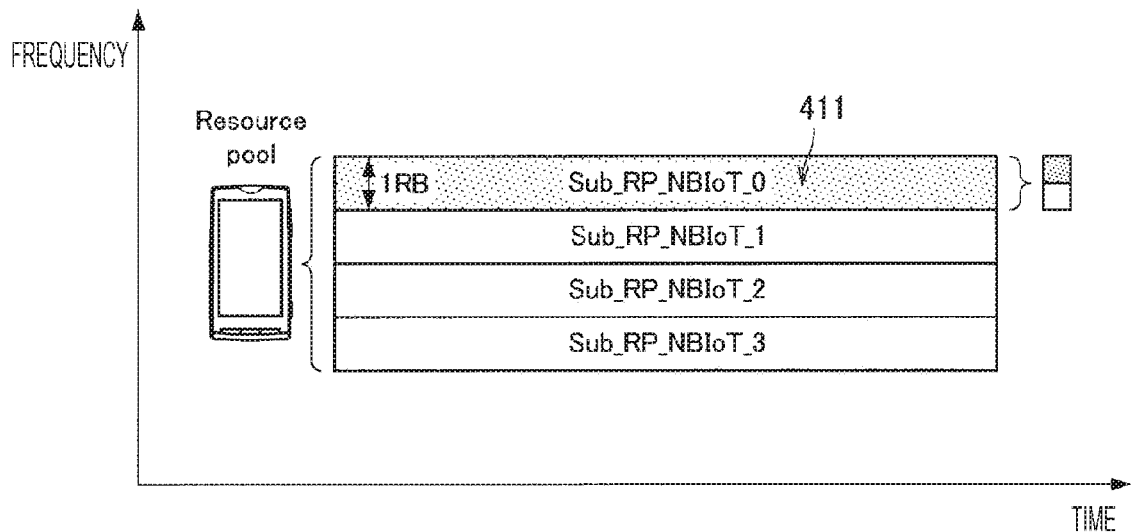
FIG. 11 is a diagram illustrating a setting example of an anchor sub resource pool.

FIGS. 10 to 13 are diagrams illustrating setting examples of the anchor sub resource pool. FIG. 10 illustrates an example of a resource pool including 6 RB sub resource pools (Sub_RP_MTC_0 to 4) for four MTC terminals. FIG. 11 illustrates an example of a resource pool including 1 RB sub resource pool (Sub_RP_NBIoT_0 to 3) for four NB-IoT terminals. In any case, the sub resource pool located at the highest frequency position in the group of sub resource pools for each of MTC terminals and NB-IoT terminals is set as anchor sub resource pools 401 and 411, respectively.

Figure 12:
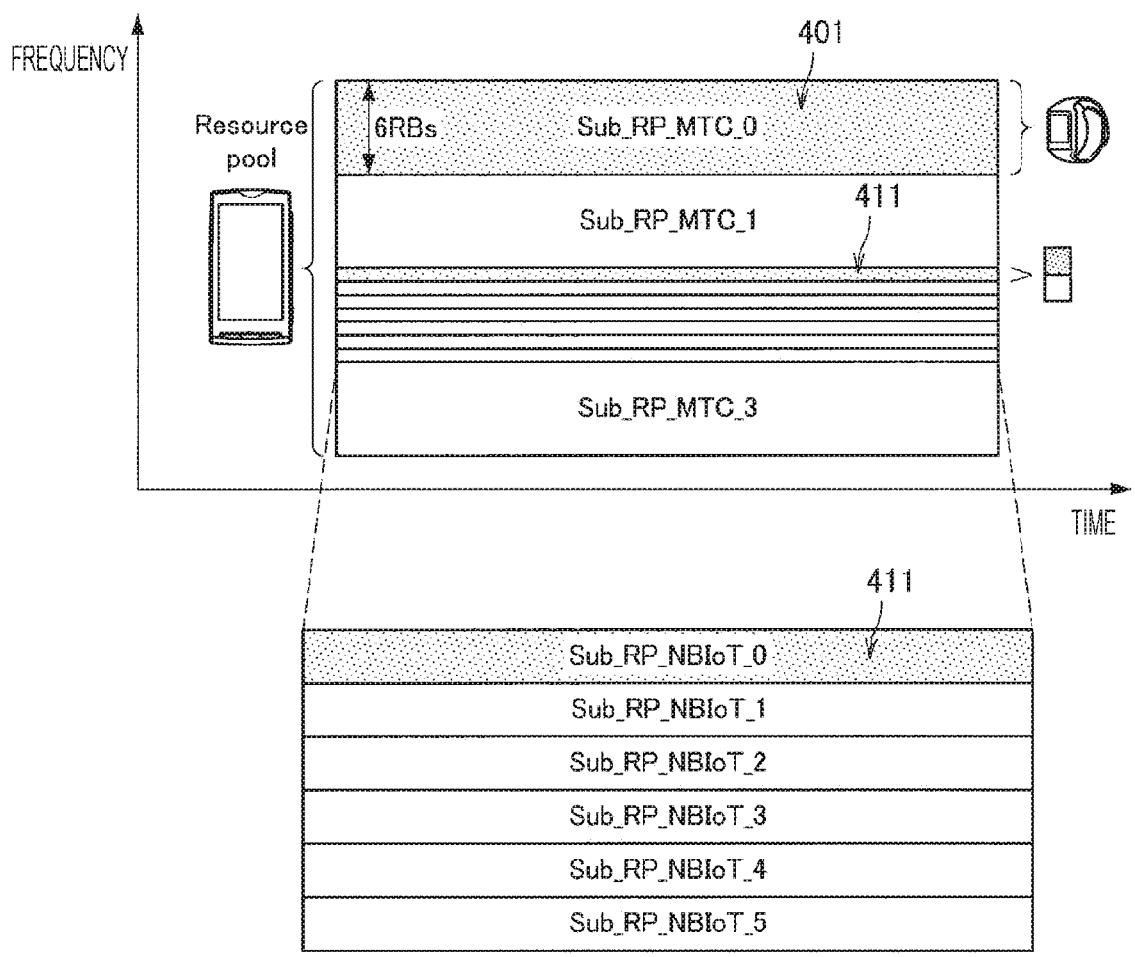
FIG. 12 is a diagram illustrating a setting example of an anchor sub resource pool.

FIG. 12 illustrates an example of a resource pool including 6 RB sub resource pools (Sub_RP_MTC_0, 1, and 3) for 3 MTC terminals and 1 RB sub resource pools (Sub_RP_NBIoT_0 to 5) for 6 NB-IoT terminals. The sub resource pool for NB-IoT terminals is set to one of the sub resource pools for MTC terminals. That is, illustrated is an example in which sub resource pools for NB-IoT terminals are set hierarchically to sub resource pools for MTC terminals. In this case, the sub resource pool located at the highest frequency position in the group of sub resource pools for MTC terminals and NB-IoT terminals is also set as anchor sub resource pools 401 and 411, respectively.

Figure 13:
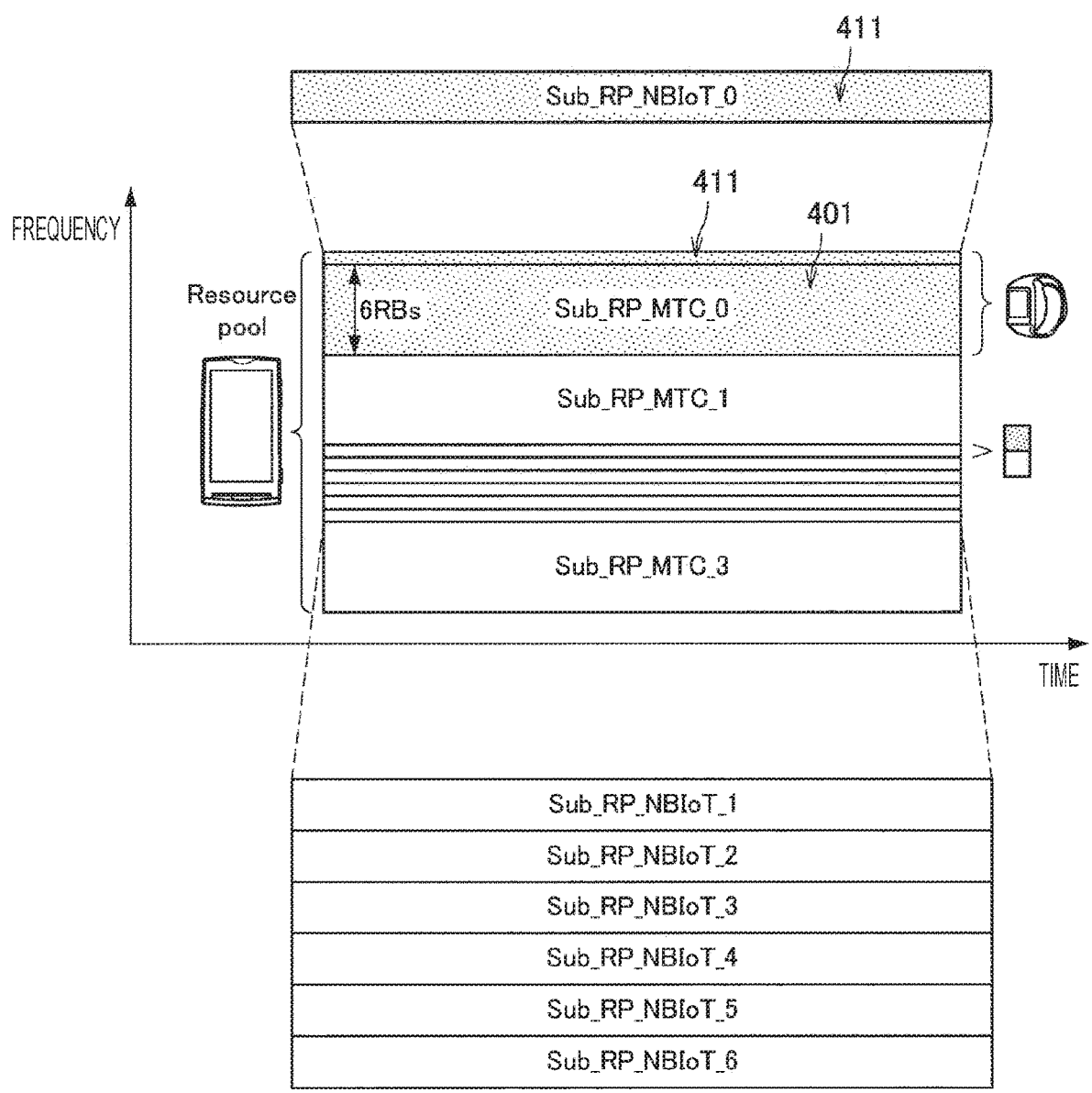
FIG. 13 is a diagram illustrating a setting example of an anchor sub resource pool.

The anchor sub resource pools may be set independently, or one may be superimposed on the other anchor sub resource pool. However, in this case, superimposition is to be made toward the anchor sub resource pool having a larger size in the frequency direction. FIG. 13 illustrates an example in which the anchor sub resource pool 411 for NB-IoT terminals is set for the anchor sub resource pool 401 in the 6 RB sub resource pool for MTC terminals. The anchor sub resource pool 401 for MTC terminals is implemented by using a sub resource pool region excluding the anchor sub resource pool 411 for NB-IoT terminals.

Resource Pool Assignment Method

Figure 14:
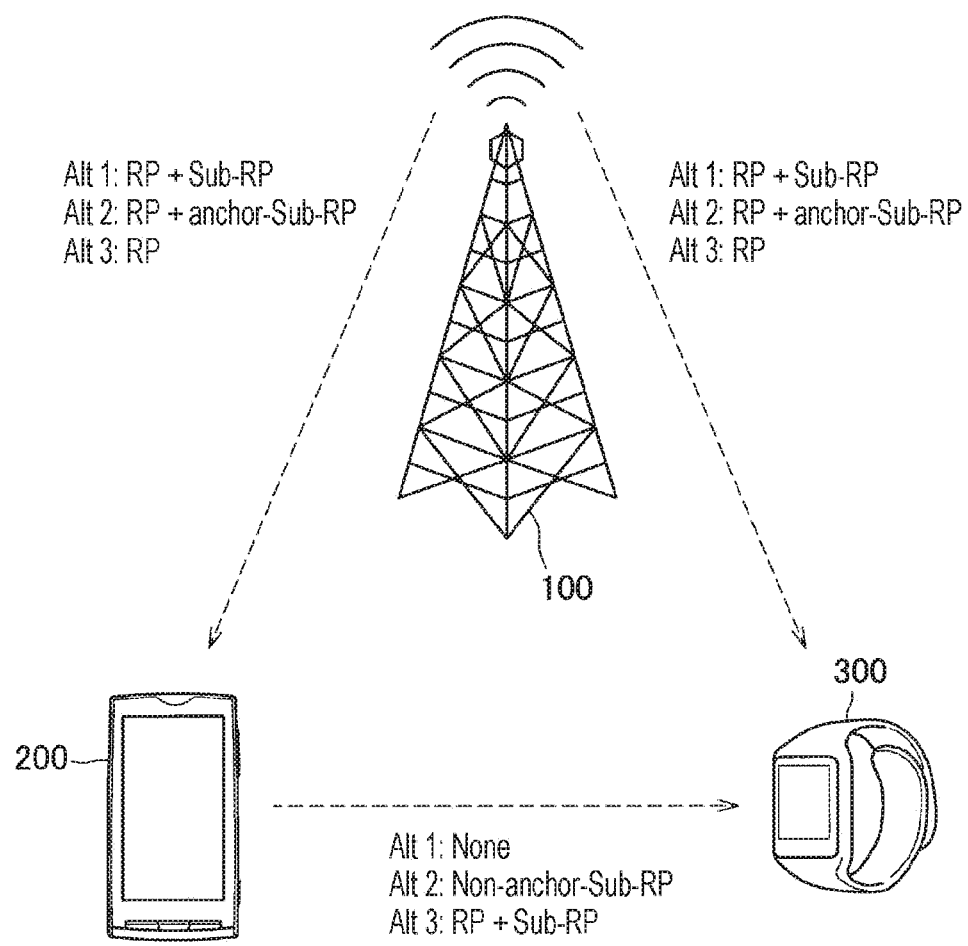
FIG. 14 is a diagram illustrating an overall picture of a resource pool assignment method.

Subsequently, three examples of resource pool assignment methods will be described. FIG. 14 is a diagram illustrating an overall picture of a resource pool assignment method.

1. Assignment by All Base Stations

First, an example in which the base station 100 assigns a resource pool and a sub resource pool to the relay terminal 200 and the remote terminal 300 is illustrated. In this case, the base station 100 assigns resource pools and sub resource pools using RRC signaling, for example.

The base station 100 notifies the relay terminal 200 and the remote terminal 300 of information regarding resource pools and information regarding sub resource pools. Notification of the information regarding the resource pool and the information regarding the sub resource pool may be performed by the transmission processing unit 151 under the control of the control unit 153, for example.

Resource Pool Related Information

Information regarding resource pools includes Resource allocation period (RAP) information, CP lengths of Control and Data, resource information of a resource pool, data hopping configuration, transmission parameters (parameters used for transmission power control of Control and Data), reception parameters (information used by the reception terminal to preferentially synchronize with the transmitting terminal), a Guard symbol flag, or the like. In the present embodiment, a combination of Control and Data is defined as RAP. Furthermore, the size in the frequency direction and the subframe bitmap in the time axis direction or the like may be used as resource information of the resource pool. Furthermore, the resource information of the resource pool may be calculated from the number of groups in the sub resource pool and size information of each of the groups. In this case, subframe bitmap or the like may be used in the time axis direction.

Sub Resource Pool Related Information

The base station 100 may notify the relay terminal 200 and the remote terminal 300 of the resource pool related information described above for the sub resource pool. In addition, the base station 100 may provide notification of, for example, sub resource pool minimum bandwidth information, channel usage rate threshold information for sub resource pool addition request, the number of sub resource pools, size information of sub resource pool in each of sub resource pool groups in frequency direction, the number of sub resource pools in each of the sub resource pool groups, assignment information of Control and Data in each of the sub resource pool groups, dedicated resource assignment information for ACK/NACK and SL-UL request transmission, upper limit number of remote terminal assignment in each of the sub resource pools, attribute information of each of sub resource pool groups (or each of sub resource pools), or the like. The sub resource pool minimum bandwidth information is used when the relay terminal 200 sets an anchor resource pool, which will be described later. The assignment information of Control and Data in each of sub resource pool groups includes information whether to use TDM, use FDM, or use both TDM and FDM. Furthermore, assignment information of Control and Data in each of sub resource pool groups includes resource assignment information of Control and Data. Examples of the attribute information of each of sub resource pool groups (or each of sub resource pools) include anchor sub resource pool information and non-anchor sub resource pool information, transmittable channel notification (for example, which of PSCCH, PSSCH, PDSCH, PSS, and PSBCH is usable), DMRS configuration information, priority information, transmittable traffic type, resource assignment policy (which mode is to be used). Notification of the above-described various types of information may be performed by the transmission processing unit 151 under the control of the control unit 153, for example.

Other Information

Additionally, the base station 100 may transmit threshold information of the upper limit of the power consumption of the relay terminal 200. The base station 100 may place restriction for an accumulated power consumption limit on the relay terminal 200 as a countermeasure for reduction in power consumption of the relay terminal 200. The relay terminal 200 is set as a normal terminal that would not perform relay communication at the time when the amount of power consumption reaches a predetermined upper limit or more. In addition, the remote terminal 300 may notify the remote terminal 300 of a message (release message) of stopping relay communication when the power consumption threshold is exceeded so as to be useful for handover of the remote terminal 300 and resource selection. Transmission of the above-described information may be performed by the transmission processing unit 151 under the control of the control unit 153, for example.

2. Assignment of Resource Pool by Base Station and Assignment of Sub Resource Pool by Relay Terminal Next illustrated will be an example in which the base station 100 performs resource pool assignment to the relay terminal 200 and the remote terminal 300, and the relay terminal 200 performs sub resource pool assignment to the remote terminal 300. In this case, the base station 100 assigns the resource pool to the relay terminal 200 and the remote terminal 300. Additionally, the base station 100 sets an anchor sub resource pool out of the sub resource pools to the relay terminal 200 and the remote terminal 300 so as to enable initial communication between the relay terminal 200 and the remote terminal 300.

In the setting of the anchor sub resource pool, it is allowable to use information preset (pre-configured) to the relay terminal 200 and the remote terminal 300, for example. For example, the relay terminal 200 and the remote terminal 300 may use the sub resource pool having highest frequency among the resource pools set from the base station 100, as an anchor sub resource pool. The bandwidth of the sub resource pool in this case may be one resource block, or it is allowable to use minimum sub resource pool bandwidth information provided in notification as resource pool assignment information. The anchor sub resource pool is an important resource, and thus is desirably set so as to reduce IBE. Therefore, the anchor sub resource pool may be set to the center frequency within the resource pool. Additionally, the relay terminal 200 and the remote terminal 300 may specify the anchor sub resource pool from the bandwidth information of the resource pool and the number of resource blocks of the anchor sub resource pool.

Furthermore, setting of the anchor sub resource pool may use information set to the relay terminal 200 from the base station 100, for example. Additionally, the relay terminal 200 may notify the remote terminal 300 of the information set from the base station 100. The relay terminal 200 may also provide notification of information regarding a relative position of the anchor sub resource pool out of the resource pool.

Furthermore, the relay terminal 200 and the remote terminal 300 may perform blind decoding and may locate the anchor sub resource pool. For example, the relay terminal 200 and the remote terminal 300 would perform decoding of the anchor sub resource pool in units of one resource block, and would increase the number of resource blocks when the decoding cannot be performed. The step size, the minimum value, and the maximum value in the blind decoding may be provided in notification in the resource pool, and may be pre-configured on the relay terminal 200 and the remote terminal 300.

The relay terminal 200 assigns non-anchor sub resource pool to the remote terminal 300. The relay terminal 200 may provide notification of assignment of the non-anchor sub resource pool by PSCCH of the anchor sub resource pool, or may provide notification of using Sidelink RRC signaling. Sidelink RRC signaling is RRC signaling dedicated for sidelinks.

The relay terminal 200 may report, to the base station 100, information regarding non-anchor sub resource pools that are not in use. The base station 100 can assign the sub resource pool not in use to another relay terminal 200.

The relay terminal 200 calculates the channel usage rate of the non-anchor sub resource pool, and makes a sub channel resource addition request to the base station 100 in a case where it is determined that the resource has been used to reach a predetermined threshold. The relay terminal 200 may use a buffer status report (BSR) in addition to the channel usage rate as a condition for making the resource addition request. The BSR may use an Aggregated BSR obtained by aggregating BSRs of the remote terminal 300 in the relay terminal 200 instead of per terminal. Furthermore, the relay terminal 200 may measure the channel usage rate for each of resource pools. The information included in the resource addition request can include channel usage rate information, requested sub resource pool group information, BSR, or the like. The base station 100 implements additional assignment of a resource pool or a sub resource pool in response to an addition request from relay terminal 200.

3. Base Station Assigning Resource Pool and Relay Terminal Assigning Resource Pool and Sub Resource Pool Next illustrated will be an example in which the base station 100 performs resource pool assignment to the relay terminal 200 and the remote terminal 300, and the relay terminal 200 performs sub resource pool assignment to the remote terminal 300. In this case, the base station 100 assigns the resource pool alone to the relay terminal 200 and the remote terminal 300, while the relay terminal assigns the resource pool and the sub resource pool including the anchor sub resource pool, to the remote terminal 300.

The relay terminal 200 uses the method 2. above and assigns the resource pool and the sub resource pool including the anchor sub resource pool, to the remote terminal 300. Assignment information according to the method described in 2. above is set to the remote terminal 300 from the relay terminal 200. In this case, the communication for resource pool assignment may be LTE sidelink or other non-3GPP communication (wireless LAN, Bluetooth (registered trademark), or the like).

Configuration Inside Anchor Sub Resource Pool

Subsequently, a configuration inside the anchor sub resource pool will be described. The anchor sub resource pool can include a Physical Sidelink Control Channel (PSCCH), a Physical Sidelink Shared Channel (PSSCH), a Physical Sidelink Synchronization Signal (PSSS), a Physical Sidelink Shared Broadcast Channel (PSBCH), and a Physical Sidelink Discovery Channel (PSDCH).

PSCCH can include Sidelink Control Information (SCI) content such as Frequency hopping flag (FH of PSSCH), Resource block assignment, Time resource pattern (TRP), resource scheduling valid period, a flag indicating whether a PSSCH signal is to be transmitted by PSCCH resource, Modulation and coding scheme, Timing advance indication, Timing adjustment value for the receiver, Destination ID, resource assignment information for ACK/NACK transmission, and an SL-UL-request.

Frequency hopping flag is information as to whether or not to perform frequency hopping. In a case where frequency hopping is to be performed, any of Intra Sub-RP FH (frequency hopping within sub resource pool), Inter same Sub-RP FH (frequency hopping across same sub resource pool), or Inter different Sub-RP FH (frequency hopping across different sub resource pools) can be set.

Resource block assignment is PSSCH resource assignment information, and is information for implementing resource assignment in the anchor sub resource pool and the non-anchor sub resource pool. In a case where frequency hopping is applied, it is allowable to include information regarding the frequency hopping.

Time resource pattern (TRP) is resource assignment pattern information used in a case where specific resource assignment is repeated a plurality of times. TRP is provided in notification as frequency assignment information in the frequency direction and time direction. In a case where one set of PSCCH and PSSCH is defined as a Resource allocation period (RAP), one TRP may be set in RAP, and a plurality of TRPs may be repeatedly assigned in one RAP.

The resource scheduling valid period is information indicating the time in which the PSCCH scheduled result would be valid in the future in a case where one set of PSCCH and PSSCH is defined as RAP. Time axis information may be provided in notification as the resource scheduling valid period, or the future number of assigned PSSCH may be set as the number of valid RAPs.

The flag indicating whether or not to transmit the PSSCH signal on the PSCCH resource is flag information whether or not to transmit PSSCH instead on the PSCCH resource for which transmission is no longer needed when crossing over the plurality of RAPs in the above-described scheduling valid period.

The resource assignment information for ACK/NACK transmission is information used for the remote terminal 300 to return an ACK/NACK on a designated resource in accordance with whether or not the data transmitted in the RAP can be received. The resource assignment unit for ACK/NACK transmission is one resource pool block. Resources for ACK/NACK transmission may be assigned across the plurality of RAPs on one PSCCH. Semi-Persistent scheduling (SPS) may be performed for resource assignment for ACK/NACK transmission. In this case, ACK/NACK transmission resource are set to the relay terminal 200 and the remote terminal 300 using RRC signaling from the base station 100. The remote terminal 300 activates the set ACK/NACK transmission resource using a PSCCH Activation indicator.

The remote terminal 300 sometimes makes SL-UL communication resource assignment requests to the relay terminal 200. At this time, the remote terminal 300 transmits an SL-UL-request as the resource assignment request. The resources used for SL-UL-request can be set similarly to the resource assignment information for ACK/NACK transmission.

In PSBCH, Sidelink Broadcast Control Channel (SBCCH) content such as Master Information Block-Sidelink (MIB-SL) can be included. MIB-SL may be transmitted per RP or may be transmitted per sub resource pool. The MIB-SL can include sidelink bandwidth information, Sidelink frame number, Sidelink subframe number, Tdd-configuration, Relay ID, PSSCH DMRS format, and SL-DL or SL-UL setting information. PSSCH DMRS format indicates the DMRS format used in PSSCH.

Assignment Method for Control and Data

Next, the configuration of Control and Data in the sub resource pool will be described. In the present embodiment, PSCCH is assumed as Control, and PSSCH is assumed as Data.

For Control and Data, there are three possible configuration patterns: (1) Time Division Multiplexing (TDM), (2) Frequency Division Multiplexing (FDM), and (3) TDM+FDM. Note that the combination of (1) to (3) may be used within the same resource pool. Furthermore, information such as BSR, traffic type, or priority information may be provided in notification from the remote terminal 300 to the relay terminal 200 as the information necessary for the above (1) to (3) assignment. Furthermore, the configuration information (1) to (3) may be set from the base station 100 at the time of assignment of the sub resource pool or the resource pool. Furthermore, the above (1) to (3) may be changed in accordance with the channel to be transmitted, such as Communication or Discovery.

(1) TDM

Figure 21:
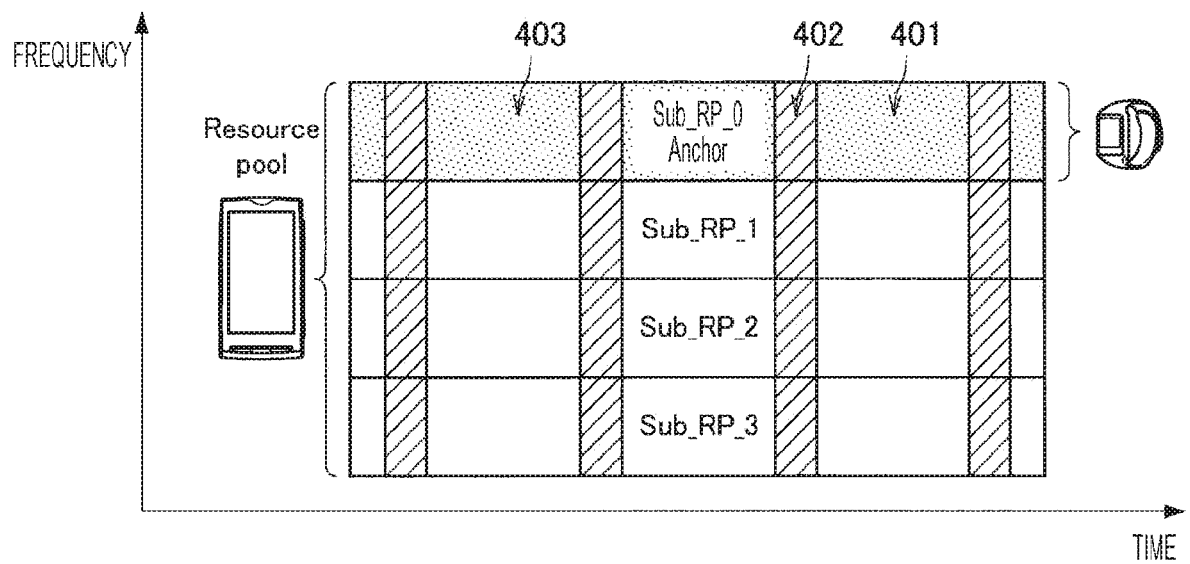
FIG. 21 is a diagram illustrating a PSCCH setting example in the case of TDM.

A PSCCH setting example in the case of TDM will be described. FIG. 21 is a diagram illustrating a PSCCH setting example in the case of TDM, and illustrates an example in which a Control region 402 and a Data region 403 are set by TDM. Reference numeral 401 denotes an anchor sub resource pool. In FeD2D, there are cases where it is difficult to obtain sufficient frequency resources because of variable bandwidth. Therefore, PSCCH assigns one resource block to one user without creating a Control channel at a symbol level such as normal LTE.

Figure 15:
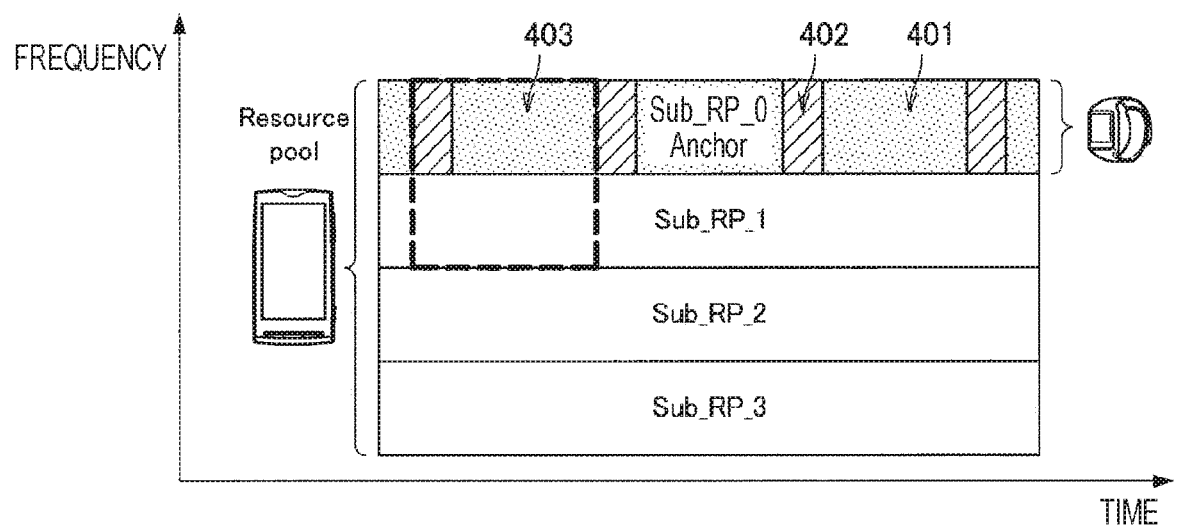
FIG. 15 is a diagram illustrating an example in which a Control region is set in an anchor sub resource pool.

In transmitting Control in the anchor sub resource pool alone, the Control region may be set in the anchor sub resource pool. FIG. 15 is a diagram of an example in which a Control region is set in the anchor sub resource pool. In this case, the Control region 402 is set in the anchor sub resource pool by TDM. Furthermore, FIG. 15 also illustrates a state where the Data region 403 is set across an anchor sub resource pool and another sub resource pool.

The relay terminal 200 and the remote terminal 300 use the anchor sub resource pool to perform communication. However, in a case where the frequency is insufficient, the relay terminal 200 can add the non-anchor sub resource pool to the resource assignment target. By implementing assignment in this manner, the relay terminal 200 would constantly transmit continuous frequencies. This maintains the single carrier property of the SC-FDMA of the relay terminal, making it possible to suppress an increase in Peak-to-Average Power Ratio (PAPR).

In this case, the relay terminal 200 and the remote terminal 300 may use, for data transmission, resources not in use in the PSCCH region. The PSCCH region is provided in notification from the base station 100 or the relay terminal 200 as sub resource pool or resource pool setting information.

Figure 16:
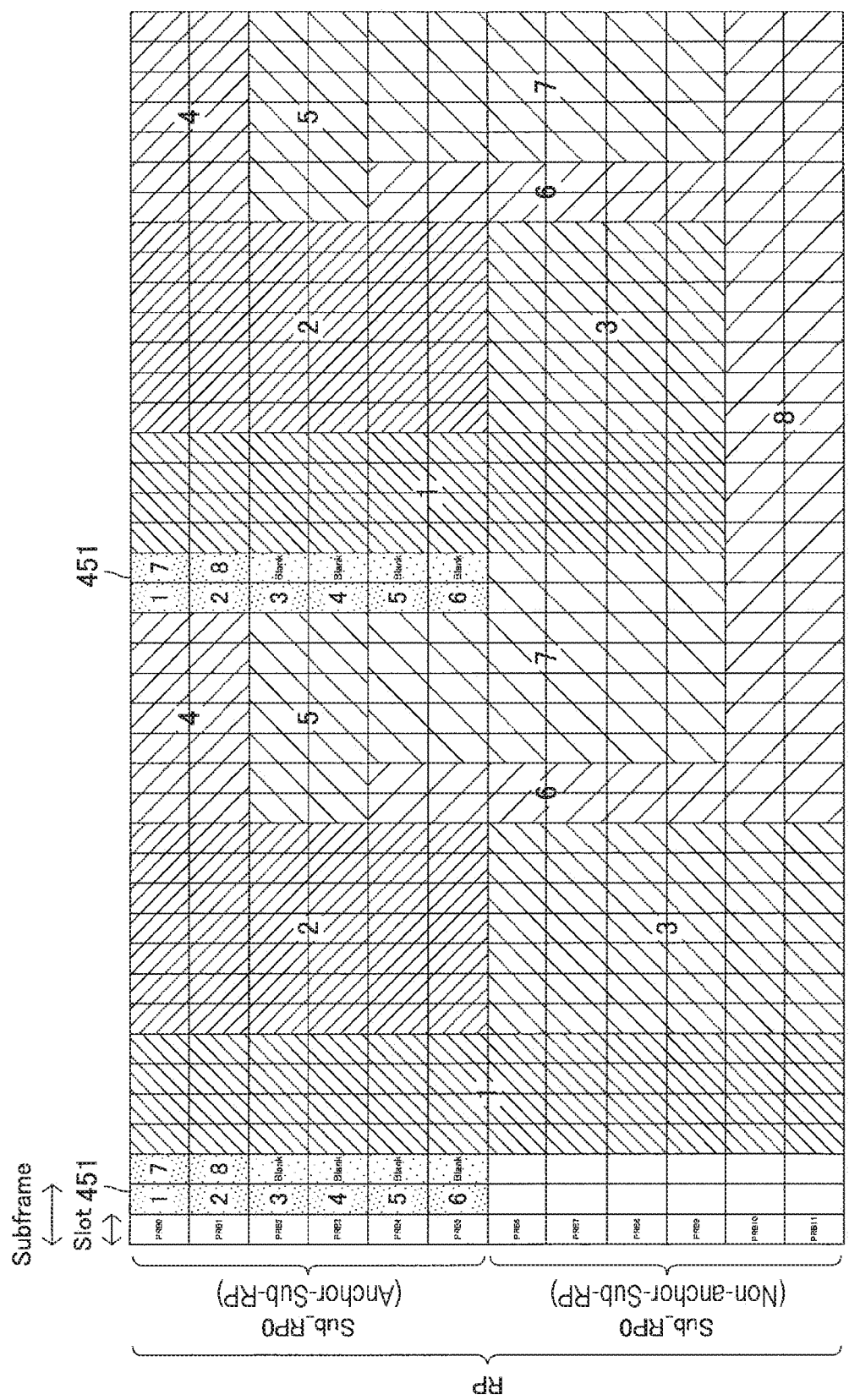
FIG. 16 is a diagram illustrating an example in which a Control region is set in an anchor sub resource pool.

FIG. 16 is a diagram of an example in which a Control region is set in the anchor sub resource pool. In the example of FIG. 16, eight pieces of control information are set in a Control region 451, and Data is transmitted in the anchor sub resource pool and the sub resource pool in accordance with the eight pieces of control information.

Figure 17:
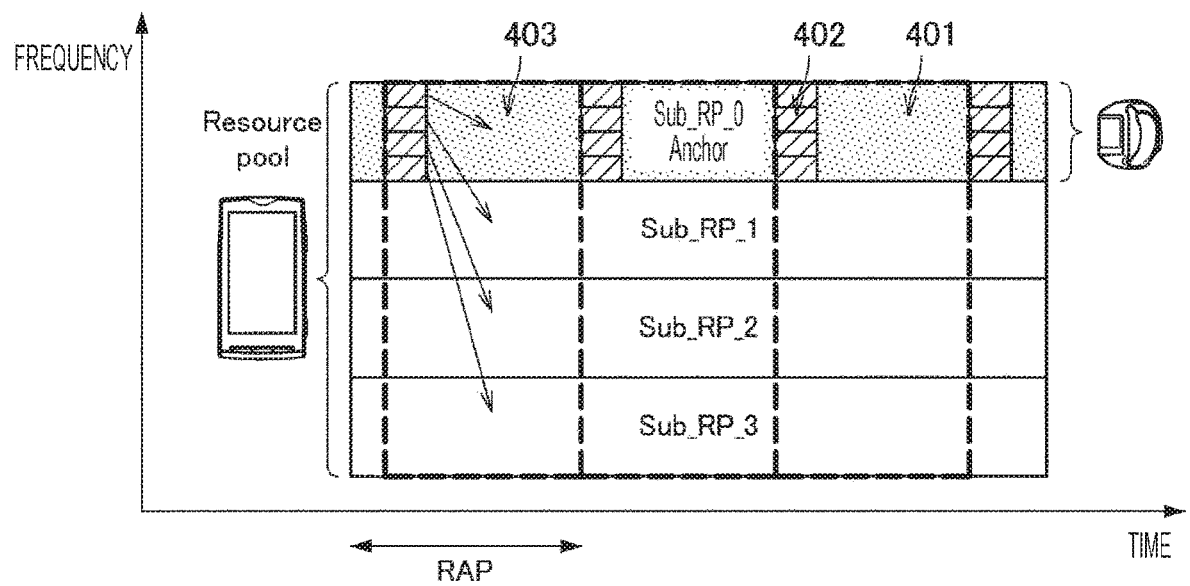
FIG. 17 is a diagram illustrating an example in which one sub resource pool is assigned to one terminal per RAP.

In a case where Control is to be transmitted in the anchor sub resource pool alone, the remote terminal 300 may assign one sub resource pool for one terminal per RAP. FIG. 17 is a diagram illustrating an example in which one sub resource pool is assigned to one terminal per RAP. FIG. 17 illustrates an example in which the Control region 402 is set in the anchor sub resource pool by TDM. Furthermore, FIG. 17 also illustrates a state where the Data region 403 is set across an anchor sub resource pool and another sub resource pool. In addition, one sub resource pool is set for Data for one terminal per RAP in the present example.

In a case where one sub resource pool is assigned to one terminal per RAP, assignment of the remote terminals 300 with the maximum number of sub resource pools is performed during the same period of time. That is, when the number of sub resource pools is four, assignment of four remote terminals 300 at maximum is performed. This eliminates the need for resource assignment of resource blocks in the frequency direction. Note that in a case where the number of remote terminals is larger than the number of sub resource pools, scheduling would be performed in the next and subsequent RAPs. In this case, two or more terminals may be assigned to each of sub resource pools, and assignment may be performed such that switching is performed in the time axis direction on the corresponding PSCCH.

Figure 18:
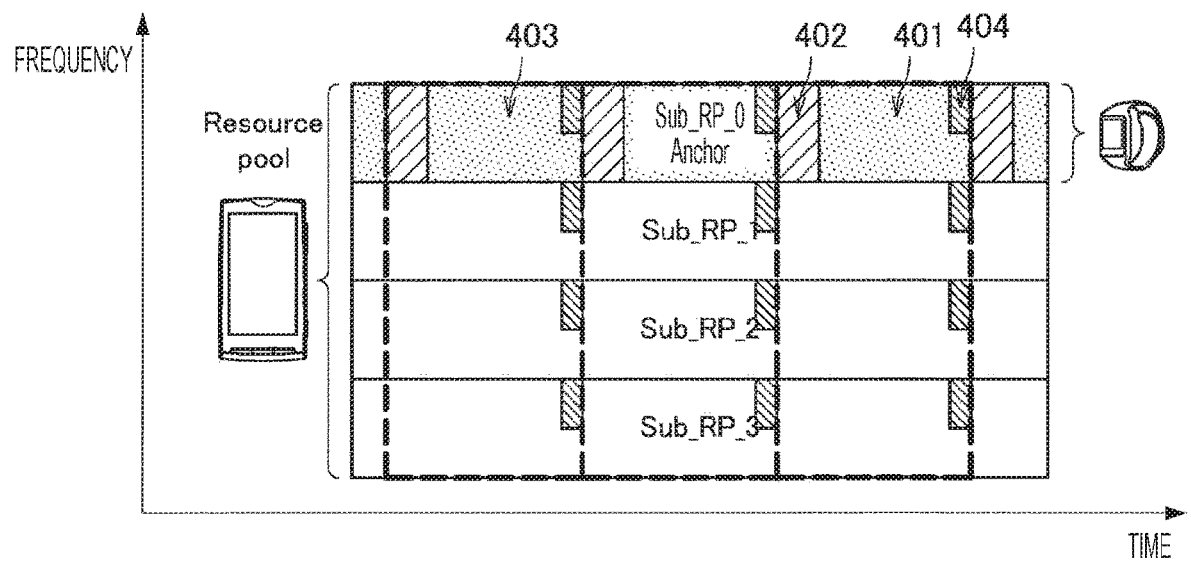
FIG. 18 is a diagram illustrating an example of assignment of ACK/NACK resources.
Figure 19:
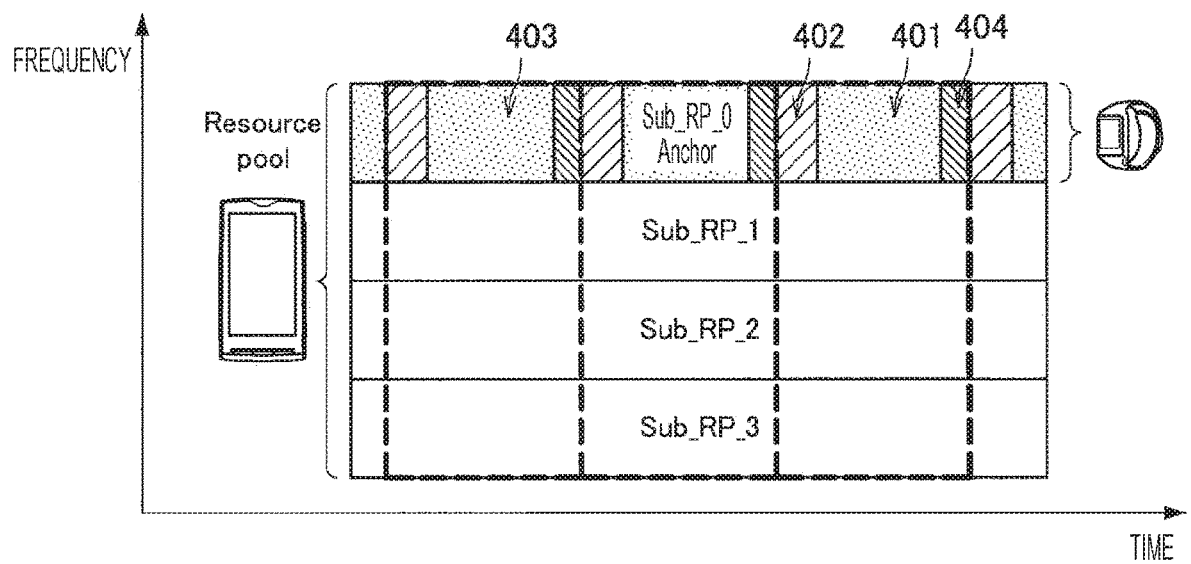
FIG. 19 is a diagram illustrating an example of assignment of ACK/NACK resources.

In the slot of the last Data resource block of RAP, resources for ACK/NACK transmission are assigned by PSCCH resource assignment. The ACK/NACK may be transmitted using one resource block. Furthermore, ACK/NACK may be multiplexed and transmitted to one resource block for a plurality of remote terminals. In this case, code multiplexing may be performed by a plurality of remote terminals 300. The code assignment at this time is performed using PSCCH. The ACK/NACK resource may be assigned to the last subframe of RAP of each of sub resource pools. FIG. 18 is a diagram illustrating an example of assignment of ACK/NACK resources, being a view illustrating an example where ACK/NACK resources 404 are individually assigned to the last subframes of RAPs of each of the sub resource pools. Furthermore, ACK/NACK resources may be collectively assigned in the last subframe of the RAP of the anchor sub resource pool. FIG. 19 is a diagram illustrating an example of assignment of CK/NACK resources, being a view illustrating an example where ACK/NACK resources 404 are collectively assigned to the last subframes of RAPs of each of the anchor sub resource pools.

Figure 20:
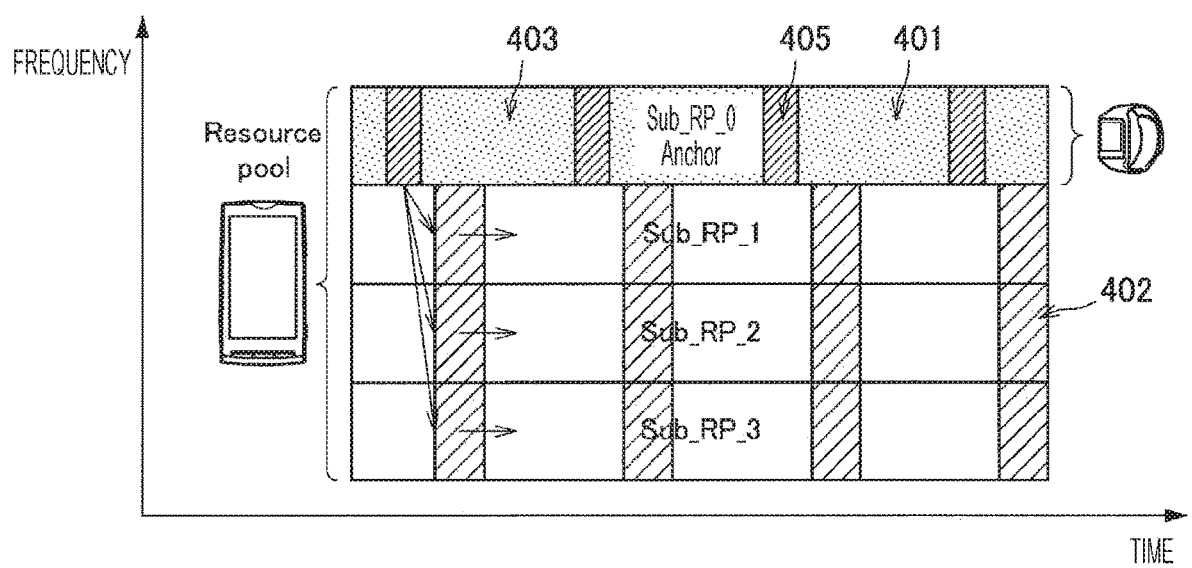
FIG. 20 is a diagram illustrating an example in which a relay terminal transmits a Control channel in an anchor sub resource pool and a non-anchor sub resource pool.

Next, an example in which the relay terminal 200 transmits Control by the anchor sub resource pool and the non-anchor sub resource pool will be described. FIG. 20 is a diagram illustrating an example in which the relay terminal 200 transmits the Control channel by an anchor sub resource pool and a non-anchor sub resource pool. FIG. 20 illustrates an example in which a Master Control region 405 is set onto the anchor sub resource pool by TDM. FIG. 20 further illustrates an example in which the Control region 402 is set onto the non-anchor sub resource pool. FIG. 20 further illustrates a state where an anchor sub resource pool, another sub resource pool, and a Data region 403 are individually set.

In the present example, assignment of the sub resource pool of the remote terminal is performed in the Control region in the anchor sub resource pool. The Control region in this anchor sub resource pool is referred to as a Master Control channel. Each of the remote terminals 300 decodes the Control channel in the sub resource pool designated by the Master control channel. With this operation, each of the remote terminals 300 determines its own Data region. Master control channel and control channel are set at the time of assignment of a resource pool or a sub resource pool.

In a case where scheduling valid range information or TRP information is included in PSCCH, scheduling is to be implemented up to the next RAP region. For example, referring to assignment 8 in FIG. 16, scheduling is implemented such that the Data region is set across the RAPs.

In a case where one PSCCH indicates a plurality of RAPs, PSCCH resources might be ineffectual in some cases. Therefore, in order to achieve efficient use of resource, PSSCH may be scheduled on the PSCCH resource that performs no transmission of PSCCH. Furthermore, the relay terminal 200 uses PSCCH to notify the remote terminal 300 of a flag as to whether or not to schedule PSSCH in a PSCCH resource that performs no transmission of PSCCH.

(2) FDM

Figure 22:
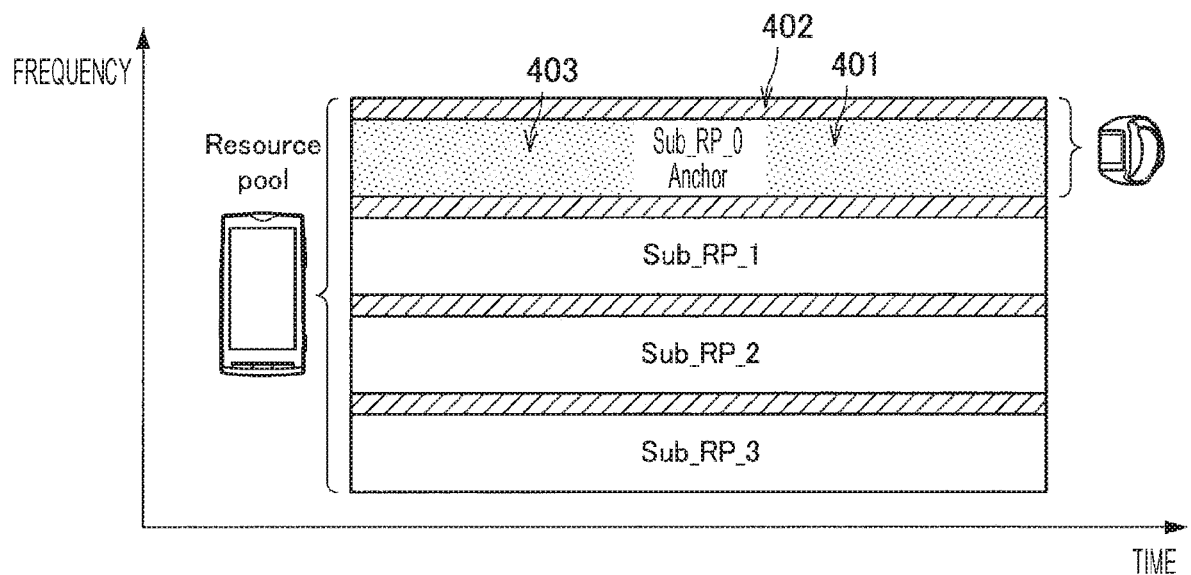
FIG. 22 is a diagram illustrating a PSCCH setting example in the case of FDM.

Next, a PSCCH setting example in the case of FDM will be described. FIG. 22 is a diagram illustrating a PSCCH setting example in the case of FDM, and illustrates an example in which a Control region 402 and a Data region 403 are set with FDM. Reference numeral 401 denotes an anchor sub resource pool. In the case of FDM, the Control channel may be located in the anchor sub resource pool alone or may be located in all sub resource pools. In a case where the Control channel is assigned to all sub resource pools, a Master Control channel is to be introduced similarly to the TDM described above.

(3) TDM+FDM

Figure 23:
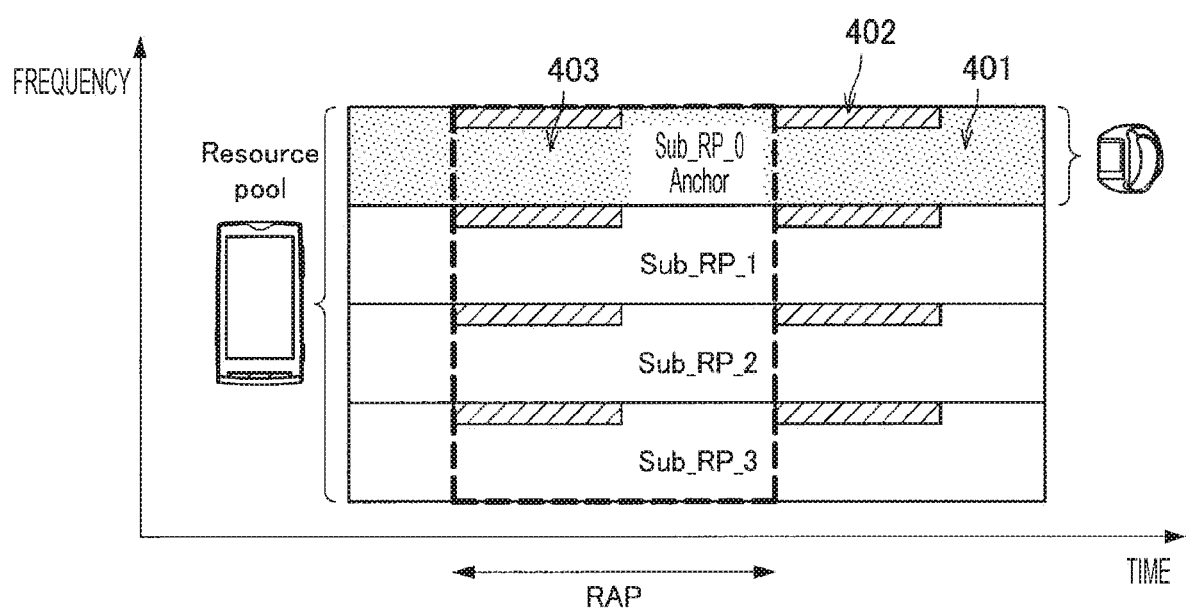
FIG. 23 is a diagram illustrating a setting example of PSCCH in which TDM and FDM are combined.

Next, a PSCCH setting example in the case of combining TDM and FDM will be described. FIG. 23 is a diagram illustrating a PSCCH setting example in the case of combining TDM and FDM, illustrating an example in which the Control region 402 and the Data region 403 are set with TDM and FDM.

In a case where TDM and FDM are combined, it is possible to reduce the load on decoding of the Control channel in the remote terminal 300 by applying restriction in the time domain for FDM assignment. The time division of TDM is set by the base station 100 or the relay terminal 200. Furthermore, the TDM on the time axis may be set as Discontinuous Reception (DRX).

In a case where TDM and FDM are combined, the Control channel may be arranged in the anchor sub resource pool alone or may be arranged in all sub resource pools, similarly to the case of TDM or FDM. In a case where Control channels are assigned to all sub resource pools, a Master Control channel is introduced similarly to TDM.

In this manner, the base station 100 or the relay terminal 200 according to the embodiment of the present disclosure can set resources for device-to-device communication between the relay terminal 200 and the remote terminal 300. In the present embodiment, a plurality of sub resource pools is configured in a resource pool, and one of the sub resource pools is defined as an anchor sub resource pool. Control information directed to the remote terminal 300 is stored in the anchor sub resource pool, and the remote terminal 300 can efficiently monitor control information by monitoring the anchor sub resource pool.

2. Application Example

The technology according to the present disclosure is applicable to various products. For example, the base station 100 may be implemented as any type of evolved Node B (eNB) such as a macro eNB or a small eNB. The small eNB may be an eNB that covers a cell smaller than a macro cell, such as a pico eNB, a micro eNB, or a home (femto) eNB. Alternatively, the base station 100 may be implemented as another type of base station such as a Node B or a Base Transceiver Station (BTS). The base station 100 may include a main body (also referred to as a base station device) that controls wireless communication, and may include one or more Remote Radio Heads (RRHs) disposed at a location different from the main body. Furthermore, various types of terminals to be described later may operate as the base station 100 by temporarily or semi-permanently executing the base station function.

Furthermore, for example, the relay terminal 200 and the remote terminal 300 may be a smartphone, a tablet personal computer (PC), a notebook PC, a portable game terminal, a mobile terminal such as a portable/dongle type mobile router or a digital camera, or may be implemented as an in-vehicle terminal such as a car navigation device. Furthermore, the relay terminal 200 and the remote terminal 300 may be implemented as a terminal (also referred to as a machine type communication (MTC) terminal) that performs machine-to-machine (M2M) communication. Furthermore, the relay terminal 200 and the remote terminal 300 may be a wireless communication module (for example, an integrated circuit module including one die) mounted on these terminals.

2-1. Application Example of Base Station

First Application Example

Figure 24:
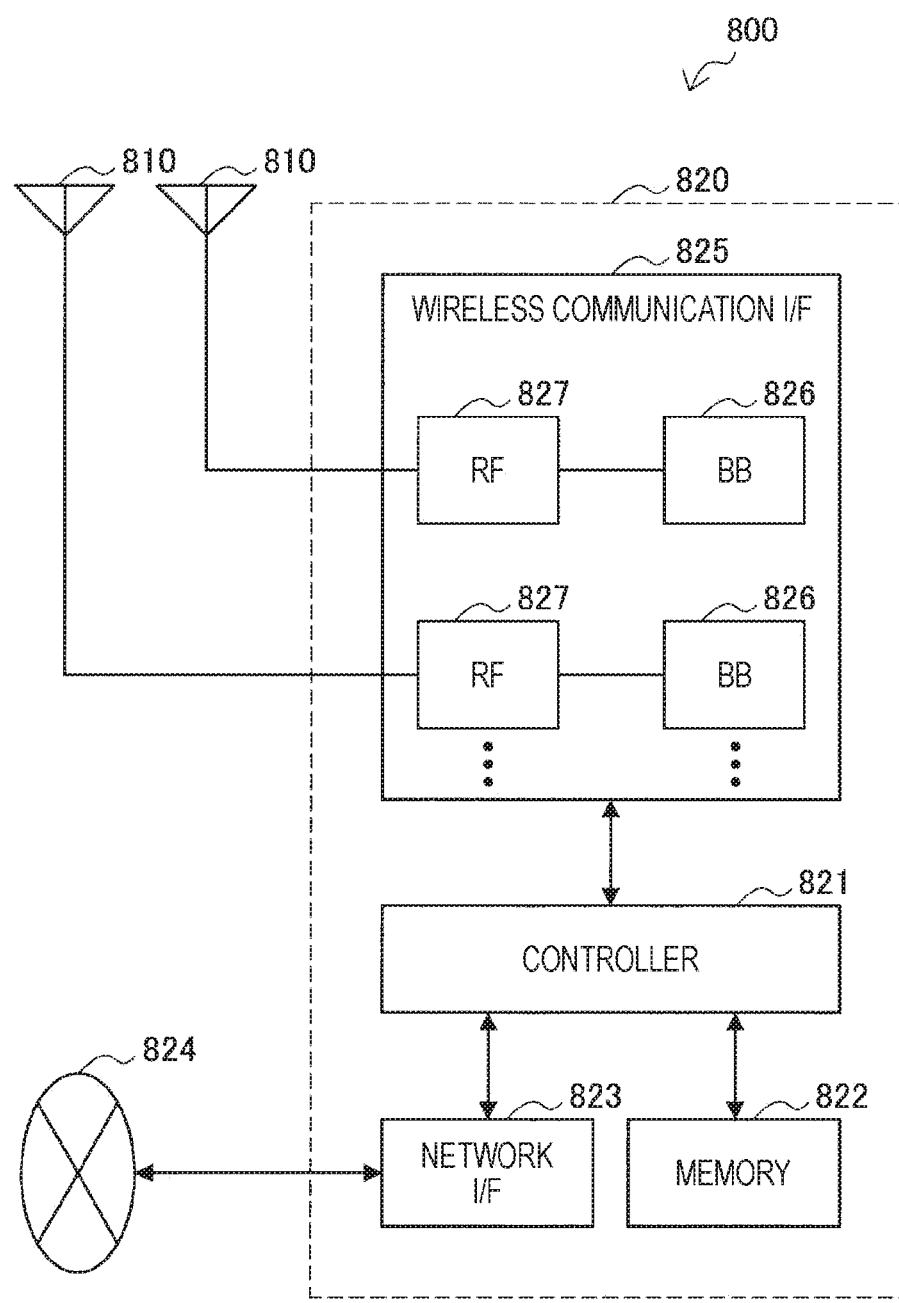
FIG. 24 is a block diagram illustrating a first example of a schematic configuration of an eNB to which the technology according to the present disclosure can be applied.

FIG. 24 is a block diagram illustrating a first example of a schematic configuration of an eNB to which the technology according to the present disclosure can be applied. The eNB 800 includes one or more antennas 810 and a base station device 820. Each of the antennas 810 and the base station device 820 can be connected to each other via an RF cable.

Each of the antennas 810 includes a single antenna element or a plurality of antenna elements (for example, a plurality of antenna elements constituting a MIMO antenna), and is used for transmission and reception of wireless signals by the base station device 820. The eNB 800 may have a plurality of antennas 810 as illustrated in FIG. 24, and each of the plurality of antennas 810 may correspond to each of a plurality of frequency bands used by the eNB 800. Note that although FIG. 24 illustrates an example in which the eNB 800 has a plurality of antennas 810, the eNB 800 may have one antenna 810.

The base station device 820 includes a controller 821, a memory 822, a network interface 823, and a wireless communication interface 825.

The controller 821 may be, for example, a CPU or a DSP, and activates various functions of the upper layer of the base station device 820. For example, the controller 821 generates a data packet from data within the signal processed by the wireless communication interface 825, and transfers the generated packet via the network interface 823. The controller 821 may generate a bundled packet by bundling data from a plurality of baseband processors and then may transfer the generated bundled packet. Furthermore, the controller 821 may include logical functions for executing controls such as: Radio Resource Control, Radio Bearer Control, Mobility Management, Admission Control, and Scheduling. Furthermore, the control may be executed in cooperation with neighboring eNBs or core network nodes. The memory 822 includes a RAM and a ROM, and stores programs executed by the controller 821 and various control data (for example, terminal list, transmission power data, scheduling data, and the like).

The network interface 823 is a communication interface for connecting the base station device 820 to the core network 824. The controller 821 may communicate with core network nodes or other eNBs via the network interface 823. In that case, the eNB 800 and the core network nodes or other eNBs may be connected to each other by a logical interface (for example, an S1 interface or an X2 interface). The network interface 823 may be a wired communication interface or a wireless communication interface for a wireless backhaul. In a case where the network interface 823 is a wireless communication interface, the network interface 823 may use a higher frequency band for wireless communication than the frequency band used by the wireless communication interface 825.

The wireless communication interface 825 supports any of cellular communication schemes such as Long Term Evolution (LTE) or LTE-Advanced, and provides a wireless connection to a terminal located in the cell of the eNB 800 via the antenna 810. The wireless communication interface 825 can typically include a baseband (BB) processor 826 and RF circuitry 827 or the like. The BB processor 826 may perform coding/decoding, modulation/demodulation, and multiplexing/demultiplexing, for example, and executes various types of signal processing of each of layers (for example, L1, medium access control (MAC), radio link control (RLC), and Packet Data Convergence Protocol (PDCP)). Instead of the controller 821, the BB processor 826 may include a portion or entire of the logical functions described above. The BB processor 826 may be a module including a memory that stores a communication control program, a processor that executes the program, and related circuitry. The function of the BB processor 826 may be changeable by updating the program. Furthermore, the module may be a card or a blade inserted into a slot of the base station device 820, or may be a chip mounted on the card or the blade. Meanwhile, the RF circuit 827 may include a mixer, a filter, an amplifier, or the like, and transmits and receives a wireless signal via the antenna 810.

As illustrated in FIG. 24, the wireless communication interface 825 may include a plurality of BB processors 826, and each of the plurality of BB processors 826 may correspond to each of a plurality of frequency bands used by the eNB 800, for example. Furthermore, the wireless communication interface 825 may include a plurality of RF circuits 827 as illustrated in FIG. 24, and each of the plurality of RF circuits 827 may correspond to each of the plurality of antenna elements. Note that although FIG. 24 illustrates an example in which the wireless communication interface 825 includes the plurality of BB processors 826 and the plurality of RF circuits 827, the wireless communication interface 825 may include one BB processor 826 or one RF circuit 827.

Second Application Example

Figure 25:
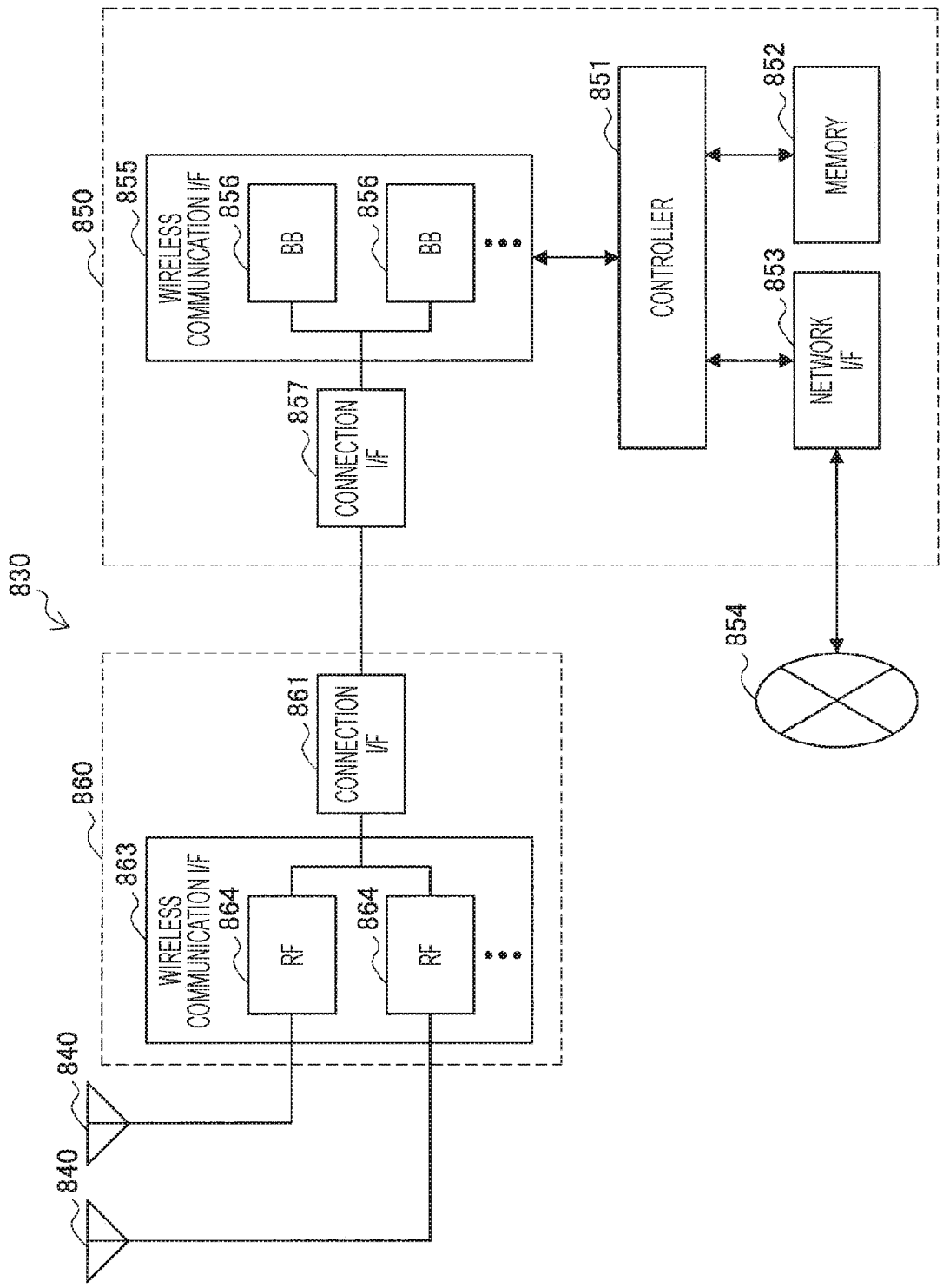
FIG. 25 is a block diagram illustrating a second example of a schematic configuration of an eNB to which the technology according to the present disclosure can be applied.

FIG. 25 is a block diagram illustrating a second example of a schematic configuration of an eNB to which the technology according to the present disclosure can be applied. An eNB 830 includes one or more antennas 840, a base station device 850, and an RRH 860. Each of the antennas 840 and RRH 860 may be connected to each other via an RF cable. Furthermore, the base station device 850 and the RRH 860 may be connected to each other by a high speed line such as an optical fiber cable.

Each of the antennas 840 includes a single antenna element or a plurality of antenna elements (for example, a plurality of antenna elements constituting a MIMO antenna), and is used for transmission and reception of wireless signals by the RRH 860. The eNB 830 may have a plurality of antennas 840 as illustrated in FIG. 25, and each of the plurality of antennas 840 may correspond to each of a plurality of frequency bands used by the eNB 830, for example. Note that although FIG. 25 illustrates an example in which the eNB 830 has a plurality of antennas 840, the eNB 830 may include one antenna 840.

The base station device 850 includes a controller 851, a memory 852, a network interface 853, a wireless communication interface 855, and a connection interface 857. The controller 851, the memory 852, and the network interface 853 are respectively similar to the controller 821, the memory 822, and the network interface 823 described with reference to FIG. 24.

The wireless communication interface 855 supports any of cellular communication schemes such as LTE or LTE-Advanced, and provides a wireless connection to terminals located in a sector corresponding to the RRH 860, via the RRH 860 and the antenna 840. The wireless communication interface 855 can typically include a BB processor 856 or the like. The BB processor 856 is similar to the BB processor 826 described with reference to FIG. 24 except that it is connected to the RF circuit 864 of the RRH 860 via the connection interface 857. As illustrated in FIG. 25, the wireless communication interface 855 may include a plurality of BB processors 856, and each of the plurality of BB processors 856 may correspond to each of a plurality of frequency bands used by the eNB 830. Note that although FIG. 25 illustrates an example in which the wireless communication interface 855 includes the plurality of BB processors 856, the wireless communication interface 855 may include one BB processor 856.

The connection interface 857 is an interface for connecting the base station device 850 (wireless communication interface 855) to the RRH 860. The connection interface 857 may be a communication module for performing communication on the above-described high speed line that connects the base station device 850 (wireless communication interface 855) to the RRH 860.

Furthermore, the RRH 860 also includes a connection interface 861 and a wireless communication interface 863.

The connection interface 861 is an interface for connecting the RRH 860 (wireless communication interface 863) to the base station device 850. The connection interface 861 may be a communication module for performing communication on the above-described high speed line.

The wireless communication interface 863 transmits and receives a wireless signal via the antenna 840. The wireless communication interface 863 can typically include an RF circuit 864 or the like. The RF circuit 864 may include a mixer, a filter, an amplifier, or the like, and transmits and receives wireless signals via the antenna 840. The wireless communication interface 863 may include a plurality of RF circuits 864 as illustrated in FIG. 25, and each of the plurality of RF circuits 864 may correspond to each of the plurality of antenna elements. Note that although FIG. 25 illustrates an example in which the wireless communication interface 863 includes the plurality of RF circuits 864, the wireless communication interface 863 may include one RF circuit 864.

In eNB 800 and eNB 830 illustrated in FIGS. 24 and 25, one or more components (one or both of the transmission processing unit 151 and the control unit 153) included in the processing unit 150 described with reference to FIG. 3 may be implemented on one or both of the wireless communication interface 855 and the wireless communication interface 863. Alternatively, at least a portion of these components may be implemented on the controller 851. As an example, the eNB 830 may be equipped with a module including a portion (for example, the BB processor 856) or entirety of the wireless communication interface 855 and/or the controller 851, and one or more of the above components may be implemented by the module. In this case, the module may store a program for causing the processor to function as the one or more components (in other words, a program for causing the processor to execute operation of the above-described one or more components) and may execute the program. As another example, a program for causing the processor to function as the above-described one or more components may be installed in the eNB 830, and one or both of the wireless communication interface 855 (for example, the BB processor 856) and the controller 851 may execute the program. As described above, the eNB 830, the base station device 850, or the above-described module may be provided as a device including the one or more components, and a program for causing a processor to function as the above-described one or more components may be provided. Furthermore, a readable recording medium that has recorded the above-described program may be provided.

Furthermore, in the eNB 830 illustrated in FIG. 25, for example, the wireless communication unit 120 described with reference to FIG. 3 may be implemented on the wireless communication interface 863 (for example, the RF circuit 864). Furthermore, the antenna unit 110 may be implemented on the antenna 840. Furthermore, the network communication unit 130 may be implemented on one or both of the controller 851 and the network interface 853.

2-2. Application Example of Terminal Apparatus

First Application Example

Figure 26:
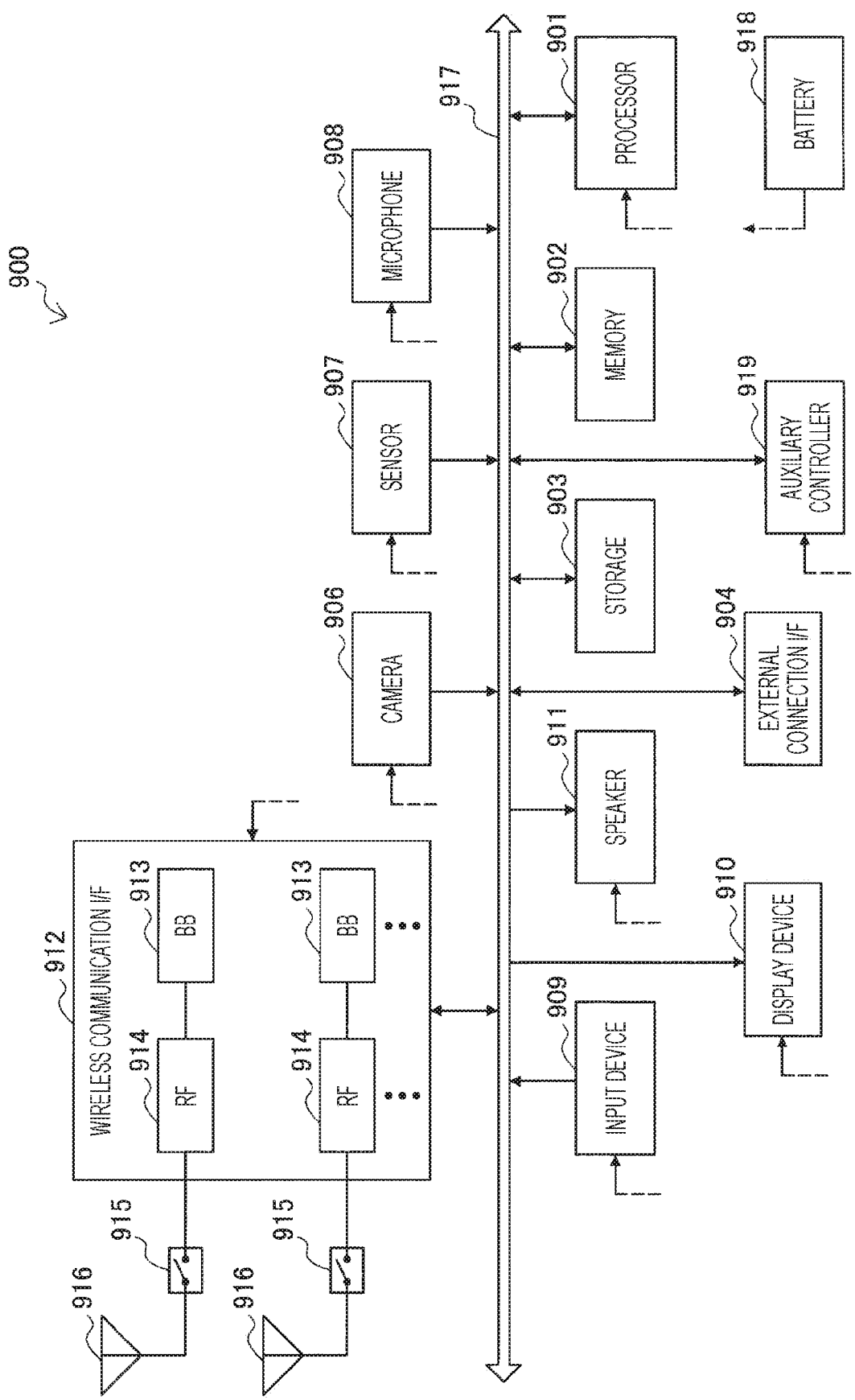
FIG. 26 is a block diagram illustrating an example of a schematic configuration of a smartphone 900 to which the technology according to the present disclosure can be applied.

FIG. 26 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a System on Chip (SoC), and controls functions of an application layer and other layers of the smartphone 900. The memory 902 includes a RAM and a ROM, and stores programs and data to be executed by the processor 901. The storage 903 may include a storage medium such as a semiconductor memory or a hard disk. The external connection interface 904 is an interface for connecting an external device such as a memory card or a universal serial bus (USB) device to the smartphone 900.

The camera 906 includes an imaging element such as a charge coupled device (CCD) or a complementary metal oxide semiconductor (CMOS), for example, and generates a captured image. The sensor 907 may include sensors such as a positioning sensor, a gyro sensor, a geomagnetic sensor, and an acceleration sensor, for example. The microphone 908 converts sound input to the smartphone 900 into an audio signal. The input device 909 includes a touch sensor, a keypad, a keyboard, a button, a switch, or the like for detecting a touch on the screen of the display device 910, for example, and receives user's operation or information input. The display device 910 includes a screen such as a liquid crystal display (LCD) or an organic light emitting diode (OLED) display, and displays an output image of the smartphone 900. The speaker 911 converts an audio signal output from the smartphone 900 into sound.

The wireless communication interface 912 supports any of cellular communication schemes such as LTE or LTE-Advanced and executes wireless communication. The wireless communication interface 912 can typically include a BB processor 913, an RF circuit 914, or the like. The BB processor 913 may perform coding/decoding, modulation/demodulation, and multiplexing/demultiplexing, for example, and executes various types of signal processing for wireless communication. Meanwhile, the RF circuit 914 may include a mixer, a filter, an amplifier, or the like, and transmits and receives a wireless signal via the antenna 916. The wireless communication interface 912 may be a one-chip module integrating the BB processor 913 and the RF circuit 914. The wireless communication interface 912 may include a plurality of the BB processors 913 and a plurality of the RF circuits 914 as illustrated in FIG. 26. Note that although FIG. 26 illustrates an example in which the wireless communication interface 912 includes the plurality of BB processors 913 and the plurality of RF circuits 914, the wireless communication interface 912 may include one BB processor 913 or one RF circuit 914.

Furthermore, the wireless communication interface 912 may support other types of wireless communication schemes such as a near field communication scheme, a proximity communication scheme, or a wireless local area network (LAN) system in addition to the cellular communication scheme. In that case, a BB processor 913 and an RF circuit 914 for each of wireless communication schemes may be included.

Each of the antenna switches 915 switches the connection destination of the antenna 916 among a plurality of circuits (for example, circuits for different wireless communication schemes) included in the wireless communication interface 912.

Each of the antennas 916 includes a single antenna element or a plurality of antenna elements (for example, a plurality of antenna elements constituting a MIMO antenna), and is used for transmission and reception of wireless signals by the wireless communication interface 912. The smartphone 900 may include a plurality of antennas 916 as illustrated in FIG. 26. Note that although FIG. 26 illustrates an example in which the smartphone 900 includes a plurality of antennas 916, the smartphone 900 may include one antenna 916.

Furthermore, the smartphone 900 may include an antenna 916 for each of wireless communication schemes. In that case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the wireless communication interface 912 and the auxiliary controller 919. The battery 918 supplies power to each of blocks of the smartphone 900 illustrated in FIG. 26 via a power supply line partially indicated by a broken line in the drawing. For example, the auxiliary controller 919 operates the minimum necessary functions of the smartphone 900 in a sleep mode.

In the smartphone 900 illustrated in FIG. 26, one or more components (one or both of the acquisition unit 241 and the control unit 243) included in the processing unit 240 described with reference to FIG. 4, and one or more components (one or both of the acquisition unit 341 and control unit 343) included in the processing unit 340 described with reference to FIG. 5 may be implemented on the wireless communication interface 912. Alternatively, at least a portion of these components may be implemented on the processor 901 or the auxiliary controller 919. As an example, the smartphone 900 may incorporate a module including a portion (for example, the BB processor 913) or entirety of the wireless communication interface 912, the processor 901, and/or the auxiliary controller 919, and the one or more components may be implemented on the module. In this case, the module may store a program for causing the processor to function as the one or more components (in other words, a program for causing the processor to execute operation of the above-described one or more components) and may execute the program. As another example, a program for causing a processor to function as the one or more components may be installed in the smartphone 900, and the wireless communication interface 912 (for example, the BB processor 913), the processor 901, and/or the auxiliary controller 919 may execute the program. As described above, the smartphone 900 or the above-described module may be provided as a device including the one or more components, and a program for causing a processor to function as the above-described one or more components may be provided. Furthermore, a readable recording medium that has recorded the above-described program may be provided.

Furthermore, in the smartphone 900 illustrated in FIG. 26, for example, the wireless communication unit 220 described with reference to FIG. 4 and the wireless communication unit 320 described with reference to FIG. 5 may be implemented on the wireless communication interface 912 (for example, the RF circuit 914). Furthermore, the antenna unit 110 may be implemented on the antenna 916.

Second Application Example

Figure 27:
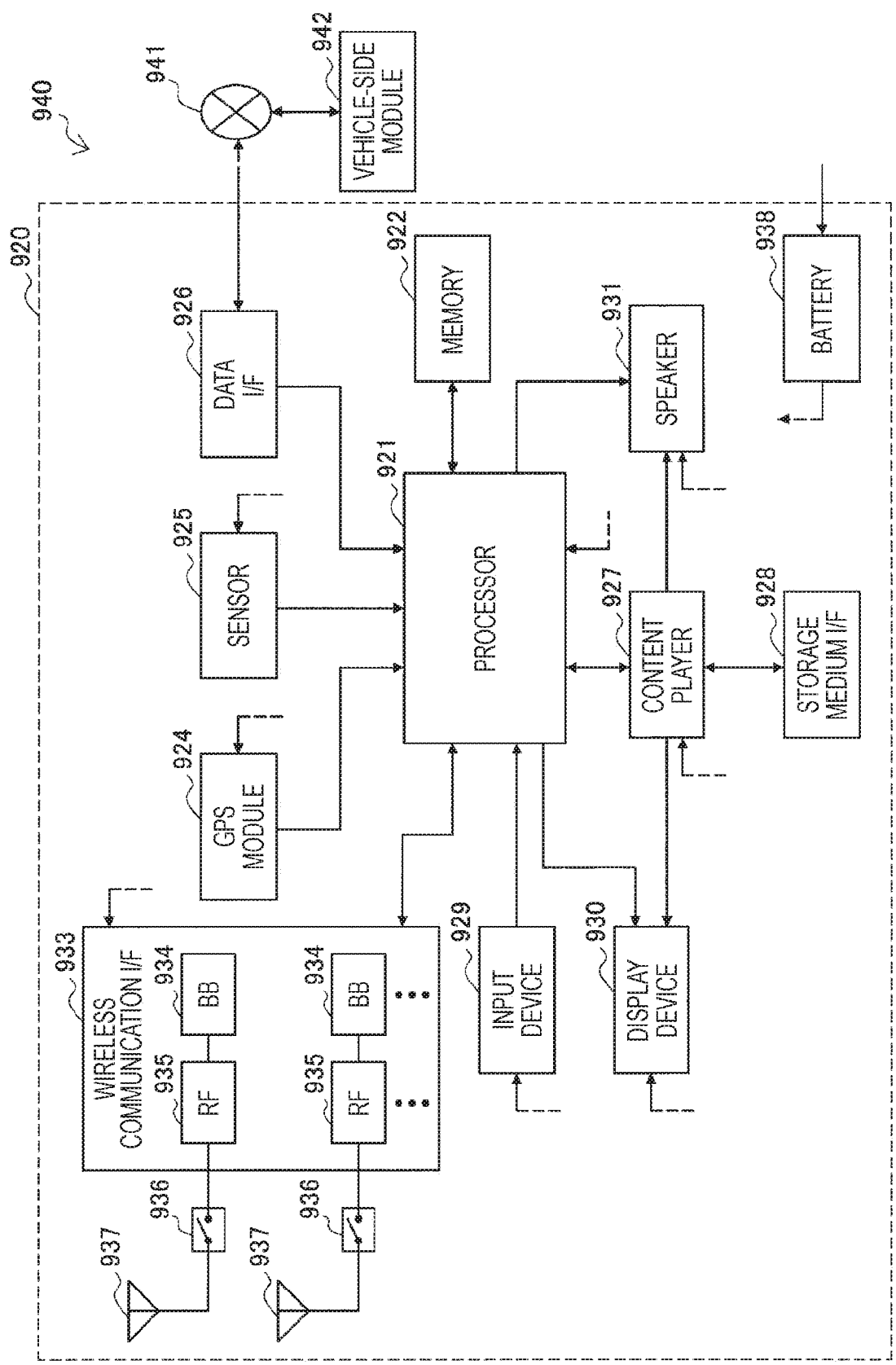
FIG. 27 is a block diagram illustrating an example of a schematic configuration of a car navigation device 920 to which the technology according to the present disclosure can be applied.

FIG. 27 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be a CPU or an SoC, for example, and controls a navigation function and other functions of the car navigation device 920. The memory 922 includes a RAM and a ROM, and stores programs and data to be executed by the processor 921.

The GPS module 924 uses a GPS signal received from the GPS satellite and measures the position (latitude, longitude, and altitude, for example) of the car navigation device 920. The sensor 925 may include sensors such as a gyro sensor, a geomagnetic sensor, and an atmospheric pressure sensor, for example. The data interface 926 is connected to an in-vehicle network 941 via a terminal (not illustrated), for example, and obtains data such as vehicle speed data generated on the vehicle side.

The content player 927 reproduces the content stored in the storage medium (for example, CD or DVD) inserted in the storage medium interface 928. The input device 929 includes a touch sensor, a button, a switch, or the like, for detecting a touch on the screen of the display device 930, for example, and receives user's operation or information input. The display device 930 includes a screen such as an LCD or an OLED display, and displays the navigation function or an image of content to be reproduced. The speaker 931 outputs the navigation function or the sound of the content to be reproduced.

The wireless communication interface 933 supports any of cellular communication schemes such as LTE or LTE-Advanced and executes wireless communication. The wireless communication interface 933 can typically include a BB processor 934, an RF circuit 935, or the like. The BB processor 934 may perform coding/decoding, modulation/demodulation, and multiplexing/demultiplexing, for example, and executes various types of signal processing for wireless communication. Meanwhile, the RF circuit 935 may include a mixer, a filter, an amplifier, or the like, and transmits and receives a wireless signal via the antenna 937. The wireless communication interface 933 may be a one-chip module integrating the BB processor 934 and the RF circuit 935. The wireless communication interface 933 may include a plurality of the BB processors 934 and a plurality of the RF circuits 935 as illustrated in FIG. 27. Note that although FIG. 27 illustrates an example in which the wireless communication interface 933 includes the plurality of BB processors 934 and the plurality of RF circuits 935, the wireless communication interface 933 may include one BB processor 934 or one RF circuit 935.

Furthermore, the wireless communication interface 933 may support other types of wireless communication schemes such as a near field communication scheme, a proximity communication scheme, or a wireless LAN system in addition to the cellular communication scheme. In that case, a BB processor 934 and an RF circuit 935 for each of wireless communication schemes may be included.

Each of the antenna switches 936 switches the connection destination of the antenna 937 among a plurality of circuits (for example, circuits for different wireless communication schemes) included in the wireless communication interface 933.

Each of the antennas 937 includes one or more antenna elements (for example, a plurality of antenna elements constituting a MIMO antenna), and is used for transmission and reception of wireless signals by the wireless communication interface 933. The car navigation device 920 may include a plurality of antennas 937 as illustrated in FIG. 27. Note that, although FIG. 27 illustrates an example in which the car navigation device 920 has a plurality of antennas 937, the car navigation device 920 may include one antenna 937.

Furthermore, the car navigation device 920 may include an antenna 937 for each of wireless communication schemes. In that case, the antenna switch 936 may be omitted from the configuration of the car navigation device 920.

The battery 938 supplies power to each of blocks of the car navigation device 920 illustrated in FIG. 27 via a power supply line partially indicated by a broken line in the figure. Furthermore, the battery 938 stores power supplied from the vehicle side.

In the car navigation device 920 illustrated in FIG. 27, one or more components (one or both of the acquisition unit 241 and the control unit 243) included in the processing unit 240 described with reference to FIG. 4, and one or more components (one or both of the acquisition unit 341 and control unit 343) included in the processing unit 340 described with reference to FIG. 5 may be implemented on the wireless communication interface 933. Alternatively, at least a portion of these components may be implemented on the processor 921. As an example, the car navigation device 920 may incorporate a module including a portion (for example, the BB processor 934) or entirety of the wireless communication interface 933 and/or the processor 921, and the one or more components may be implemented on the module. In this case, the module may store a program for causing the processor to function as the one or more components (in other words, a program for causing the processor to execute operation of the above-described one or more components) and may execute the program. As another example, a program for causing a processor to function as the one or more components may be installed in the car navigation device 920, and the wireless communication interface 933 (for example, the BB processor 934) and/or the processor 921 may execute the program. As described above, the car navigation device 920 or the module may be provided as a device including the one or more components, and a program for causing the processor to function as the one or more components may be provided. Furthermore, a readable recording medium that has recorded the above-described program may be provided.

Furthermore, in the car navigation device 920 illustrated in FIG. 27, for example, the wireless communication unit 220 described with reference to FIG. 4 and the wireless communication unit 320 described with reference to FIG. 5 may be implemented on the wireless communication interface 933 (for example, the RF circuit 935). Furthermore, the antenna unit 110 may be implemented on the antenna 937.

In addition, the technology according to the present disclosure may be implemented as an in-vehicle system (or vehicle) 940 including one or more blocks of the car navigation device 920, the in-vehicle network 941, and a vehicle-side module 942. That is, the in-vehicle system (or vehicle) 940 may be provided as a device including the one or more components included in the processing unit 150. The vehicle-side module 942 generates vehicle-side data such as vehicle speed, engine speed, or failure information, and outputs the generated data to the in-vehicle network 941.

3. Summary

As described above, according to the embodiment of the present disclosure, it is possible to provide, in FeD2D communication for a remote terminal, the base station 100, the relay terminal 200, and the remote terminal 300, capable of achieving enhancement in communication quality of FeD2D communication while reducing power consumption in the relay terminal and the remote terminal.

Although the embodiment of the present disclosure has described an example in which the communication system conforms to LTE or LTE-A, the present disclosure is not limited to such an example. For example, the communication system may be a system conforming to another communication standard.

Furthermore, the processing steps in the processing of this specification do not necessarily have to be executed chronologically in the order described in the flowchart or sequence diagram. For example, the processing steps in the processing may be executed in an order different from the order described as the flowchart or the sequence diagram, or may be executed in parallel.

In addition, it is possible to create a computer program for causing a processor (for example, a CPU, a DSP, etc.) provided in the device (for example, a terminal apparatus, a base station or a control entity, or a module thereof) of the present specification to function as the apparatus. (In other words, it is possible to create a computer program to cause the processor to execute the operation of the components of the apparatus.) Moreover, the recording medium that has recorded the computer program may also be provided. In addition, an apparatus (for example, a finished product or a module for a finished product (component, processing circuit, chip, etc.)) including a memory that stores the computer program and one or more processors capable of executing the computer program may also be provided. Furthermore, methods including the operation of one or more components of the device (for example, the acquisition unit and/or the control unit, and others) are included in the technology according to the present disclosure.

Hereinabove, the preferred embodiments of the present disclosure have been described above with reference to the accompanying drawings, while the technical scope of the present disclosure is not limited to the above examples. A person skilled in the art in the technical field of the present disclosure may find it understandable to reach various alterations and modifications within the technical scope of the appended claims, and it should be understood that they will naturally come within the technical scope of the present disclosure.

In addition, the effects described in this specification are merely illustrative or exemplary, and are not limiting. That is, the technology according to the present disclosure can exhibit other effects obvious to those skilled in the art from the description of the present specification together with the above effects or in place of the above effects.

Note that the following configuration should also be within the technical scope of the present disclosure.

(1)

A communication apparatus including a setting unit that sets a resource for device-to-device communication, in which the setting unit sets a resource pool including a plurality of sub resource pools as a resource for the device-to-device communication, and one of the sub resource pools is an anchor sub resource pool that stores control information for monitoring by the device that performs the device-to-device communication.

(2)

The communication apparatus according to (1), in which the setting unit sets a resource pool for control information and data for the anchor sub resource pool, and sets a resource pool for data for the sub resource pools other than the anchor sub resource pool.

(3)

The communication apparatus according to (1) or (2), in which the setting unit sets the control information within the anchor sub resource pool such that assignment information of one of data in the anchor sub resource pool or data in the other sub resource pools is to be included.

(4)

The communication apparatus according to (3), in which the setting unit sets information indicating the sub resource pool to which data is to be assigned.

(5)

The communication apparatus according to any of (1) to (4), in which the setting unit sets the anchor sub resource pool in a frequency band to be a center frequency of the resource pool.

(6)

The communication apparatus according to any of (1) to (5), in which the setting unit provides notification of a setting position of the anchor sub resource pool by signaling.

(7)

The communication apparatus according to any of (1) to (6), in which the setting unit sets a resource to be assigned for transmission of ACK or NACK by a device that performs the device-to-device communication.

(8)

The communication apparatus according to (7), in which the setting unit assigns the resource to be assigned for transmission of the ACK or NACK to a last subframe of each of the sub resource pools.

(9)

A communication apparatus including a setting unit that sets a resource for device-to-device communication, in which the setting unit sets a plurality of sub resource pools in a resource pool assigned from a base station for device-to-device communication, and one of the sub resource pools is an anchor sub resource pool that stores control information for monitoring by the device that performs the device-to-device communication.

(10)

The communication apparatus according to (9), in which the setting unit performs control to notify the base station of information regarding the sub resource pool not in use, other than the anchor sub resource pool.

(11)

The communication apparatus according to (9) or (10), in which the setting unit calculates a channel usage rate of the sub resource pool other than the anchor sub resource pool, and makes a resource addition request to the base station in a case where the channel usage rate is a predetermined threshold or more.

(12)

The communication apparatus according to any of (9) to (11), in which the setting unit sets a resource to be assigned for transmission of ACK or NACK by a device that performs the device-to-device communication.

(13)

The communication apparatus according to (12), in which the setting unit assigns the resource to be assigned for transmission of the ACK or NACK to a last subframe of each of the sub resource pools.

(14)

The communication apparatus according to any of (9) to (13), in which in a case where frequency is insufficient with the anchor sub resource pool, the setting unit assigns the sub resource pool other than the anchor sub resource pool and having frequency being continuous with the anchor sub resource pool, to the resource of the device-to-device communication.

(15)

The communication apparatus according to any of (9) to (14), in which the setting unit performs control to provide notification of a setting position of the anchor sub resource pool by signaling.

(16)

A terminal apparatus including a control unit that performs control for device-to-device communication, in which the control unit performs control to perform the device-to-device communication in the resource pool including a plurality of sub resource pools including an anchor sub resource pool that stores control information for the device-to-device communication, assigned for the purpose of the device-to-device communication.

(17)

The terminal apparatus according to (16), in which the control unit simply monitors control information in the anchor sub resource pool.

REFERENCE SIGNS LIST

100 Base station
200 Relay terminal
300 Remote terminal

The invention claimed is:

1. A communication apparatus, comprising:
a processor configured to:
set a first resource pool including a plurality of sub resource pools,
wherein the plurality of sub resource pools corresponds to a first resource for device-to-device communication; and
set a setting position of an anchor sub resource pool among the plurality of sub resource pools, wherein the anchor sub resource pool is for a device that performs the device-to-device communication, and
the anchor sub resource pool stores control information monitored by the device;
set a second resource pool for each of the control information and first data associated with the anchor sub resource pool; and
set a third resource pool for second data associated with non-anchor sub resource pools of the plurality of sub resource pools.

2. The communication apparatus according to claim 1, wherein
the processor is further configured to set the control information within the anchor sub resource pool, and
the set control information includes assignment information of one of the first data in the anchor sub resource pool or the second data in the non-anchor sub resource pools of the plurality of sub resource pools.

3. The communication apparatus according to claim 2, wherein the assignment information indicates a sub resource pool of the plurality of sub resource pools to which third data is to be assigned.

4. The communication apparatus according to claim 1, wherein
the processor is further configured to set the anchor sub resource pool to a center frequency of a frequency band, and
the frequency band corresponds to the first resource pool.

5. The communication apparatus according to claim 1, wherein the processor is further configured to transmit a notification of the setting position of the anchor sub resource pool by a signaling process.

6. The communication apparatus according to claim 1, wherein the processor is further configured to set a second resource for transmission of one of ACK or NACK by the device.

7. The communication apparatus according to claim 6, wherein the processor is further configured to assign the second resource to a last subframe of each of the plurality of sub resource pools.

8. A communication apparatus, comprising:
a processor configured to:
set a plurality of sub resource pools in a resource pool assigned from a base station,
wherein the plurality of sub resource pools corresponds to a first resource for device-to-device communication; and
set a setting position of an anchor sub resource pool among the plurality of sub resource pools, wherein the anchor sub resource pool is for a device that performs the device-to-device communication, and
the anchor sub resource pool stores control information monitored by the device;
calculate a channel usage rate of a non-anchor sub resource pool of the plurality of sub resource pools; and
transmit a resource addition request to the base station in a case where the calculated channel usage rate is equal to or greater than a specific threshold.

9. The communication apparatus according to claim 8, wherein
the processor is further configured to notify the base station of information regarding an unused sub resource pool of the plurality of sub resource pools, and
the unused sub resource pool is different from the anchor sub resource pool.

10. The communication apparatus according to claim 8, wherein the processor is further configured to set a second resource for transmission of one of ACK or NACK by the device.

11. The communication apparatus according to claim 10, wherein the processor is further configured to assign the second resource to a last subframe of each of the plurality of sub resource pools.

12. The communication apparatus according to claim 8, wherein
in a case where a first frequency is insufficient with the anchor sub resource pool, the processor is further configured to assign the non-anchor sub resource pool of the plurality of sub resource pools to the first resource of the device-to-device communication, and
the non-anchor sub resource pool has a second frequency that is continuous with the first frequency.

13. The communication apparatus according to claim 8, wherein the processor is further configured to transmit a notification of the setting position of the anchor sub resource pool by a signaling process.

14. A terminal apparatus, comprising:
a processor configured to control device-to-device communication in a resource pool assigned by a communication apparatus, wherein
the resource pool includes a plurality of sub resource pools,
one of the plurality of sub resource pools is an anchor sub resource pool,
the communication apparatus sets a setting position of the anchor sub resource pool,
the anchor sub resource pool stores control information for the device-to-device communication, and
the communication apparatus:
calculates a channel usage rate of a non-anchor sub resource pool of the plurality of sub resource pools, and
transmits a resource addition request to a base station in a case where the calculated channel usage rate is equal to or greater than a specific threshold.

15. The terminal apparatus according to claim 14, wherein the processor is further configured to monitor the stored control information in the anchor sub resource pool.

* * * * *